United States Patent
Leong et al.

(10) Patent No.: US 6,329,635 B1
(45) Date of Patent: Dec. 11, 2001

(54) METHODS FOR WELD MONITORING AND LASER HEAT TREATMENT MONITORING

(75) Inventors: Keng H. Leong, Lockport, IL (US); Paul G. Sanders, Brookline, MA (US)

(73) Assignee: The University of Chicago, Chicago, IL (US)

(*) Notice: Subject to any disclaimer, the term of this patent is extended or adjusted under 35 U.S.C. 154(b) by 0 days.

(21) Appl. No.: 09/182,927

(22) Filed: Oct. 30, 1998

(51) Int. Cl.$^7$ .................................................. B23K 26/02
(52) U.S. Cl. ............................. 219/121.83; 219/121.63; 219/121.64; 219/130.01; 219/124.34; 219/130.21
(58) Field of Search ..................... 219/121.83, 121.63, 219/121.64, 130.01, 124.34, 130.21

(56) References Cited

U.S. PATENT DOCUMENTS

| | | | |
|---|---|---|---|
| 3,567,899 | * 3/1971 | Iceland et al. | 219/125 |
| 3,858,025 | * 12/1974 | Sidbeck et al. | 219/137 |
| 4,375,026 | * 2/1983 | Kearney | 219/130.01 |
| 4,854,724 | * 8/1989 | Adams et al. | 374/5 |
| 5,302,799 | * 4/1994 | Kennedy et al. | 219/124.34 |
| 5,651,903 | * 7/1997 | Shirk | 219/121.64 |
| 5,674,415 | * 10/1997 | Leong et al. | 219/121.83 |
| 5,681,490 | * 10/1997 | Chang | 219/121.64 |

OTHER PUBLICATIONS

Product Brochure entitled "Modular Process Control system (MPC)", dated 1993, published by Fraunhofer, Aachen, Germany.

Product Brochure entitled "SynchroVision—For Pulsed Laser Welding", undated, published by Control Vision, Idaho Falls, ID.

Nava–Rudiger, and Houlot, M. (1997). Integration of real time quality control systems in a welding process. J. Laser Appl., 9, pp. 95–102.

Olsen, F.O., Jorgensen, H., Bagger, C., Kristensen, T., and Gregersen, O. (1992). Recent investigations in sensors for adaptive control of laser cutting and welding. In: Proc. LAMP 92, Nagoka, Japan: High Temperature Society of Japan, pp. 405–414.

Mori, K., and Miyamoto, I. (1997). In–process monitoring of laser welding by the analysis of ripples in the plasma emission. J. Laser Appl., 9, pp. 155–159.

Product Brochure entitled "LaserStrobe", undated, published by Control Vision, Idaho Falls, ID.

* cited by examiner

*Primary Examiner*—M. Alexandra Elve
(74) *Attorney, Agent, or Firm*—Joan Pennington

(57) ABSTRACT

Methods for weld monitoring and for laser heat treatment monitoring are provided using infrared emissions. In the method for weld monitoring, an infrared (IR) signature emitted by a hot weld surface during welding is detected. The detected infrared signature is compared with a steady state infrared signature signal. The compared results are correlated with a predetermined weld parameter. The predetermined weld parameter includes at least one of a full penetration weld, a workpiece misalignment, and a workpiece contamination. In the method for monitoring a laser heat treating process, an infrared (IR) energy signal emitted by a workpiece surface during the laser heat treating process is detected. The detected energy signal is compared with a predefined voltage range. The compared results are correlated to identify a potential defect.

5 Claims, 25 Drawing Sheets

METHODS FOR WELD MONITORING AND LASER HEAT TREATMENT MONITORING

CONTRACTUAL ORIGIN OF THE INVENTION

The United States Government has rights in this invention pursuant to Contract No. W-31-109-ENG-38 between the United States Government and the University of Chicago.

FIELD OF THE INVENTION

The present invention relates to improved methods for weld monitoring and for monitoring laser heat treating processes.

DESCRIPTION OF THE RELATED ART

The use of laser beam welding in industrial processes has increased significantly in recent years. Compared to conventional arc-welding, laser beam welding allows higher process speeds, better precision, and smaller heat affected zones. Although cost has traditionally been a limitation to the installation of laser welding stations on the factory floor, consideration of all manufacturing costs and production requirements usually reveals that laser welding is competitive and in many cases better. The continuing increase in power and decrease in price of new laser systems enhance the competitive advantage of laser welding. As the use of laser welding technology increases, so does the need for reliable methods for process monitoring.

There are several characteristic signals associated with the laser beam welding process. If a laser beam of sufficient irradiance to melt the metal is focused at or into the surface of the work piece, a keyhole is formed. This keyhole within the molten metal is sustained by the evaporation of metal from the weld pool. The outward flow of this metallic vapor from the keyhole produces acoustic waves. Plasma is formed within and above the keyhole by ionization of the shielding gas and the metallic vapor. The primary signal from the welding process is the infrared emissions from the weld pool. Secondary signals include the radiation from the plasma (primarily in the visible and ultraviolet region) and the acoustic waves. Most weld monitoring methods sense at least one of these signals.

Variations in the plasma or acoustic emissions may indicate changes in weld quality, but monitoring these secondary signals tends to be difficult, complex, and expensive to implement. On the other hand, primary infrared emissions simply indicate the heat content of the weld. For example, deeper penetration tends to correlate with increased local heat input (caused by higher laser beam irradiances or slower travel speeds). Greater heat input results in higher temperatures and increased infrared emissions. The temperature may be monitored by a pyrometer, but this is difficult due to the slow response time of the system and the presence of an intense thermal signal from the plasma inside the keyhole. A better indicator is the infrared energy emitted by the weld, including both the contributions from the hot molten metal and the keyhole plasma. The ultraviolet and visible contributions may be minimized by selecting an infrared detector having a maximum sensitivity in the range of the molten metal emissions.

Using Wien's law ($\lambda_{max}$=2898/T), the wavelength ($\mu$m) with the maximum radiant energy may be estimated at a specific temperature (K). For the case of steel, which is liquid from about 1800 to 3100 K, the wavelength of interest for weld monitoring would be in the near infrared (from 0.9 to 1.6 $\mu$m). Due to the higher temperature and characteristic emissions of the keyhole plasma, the majority of the radiant energy is at shorter wavelengths in the visible and ultraviolet range.

U.S. Pat. No. 5,674,415 issued Oct. 7, 1997 to Keng H. Leong and Boyd V. Hunter, and assigned to the present assignee, discloses a low cost, robust, and rugged weld monitoring device. The robustness of the device is related to the ease of data analysis and the minimization of mistagged welds. The rugged weld monitor operates reliably in the harsh manufacturing environment. An infrared signature emitted by a hot weld surface during welding is detected and this signature is compared with an infrared signature emitted by the weld surface during steady state conditions. The result is correlated with weld penetration. The signal processing is simpler than for either UV or acoustic techniques. Changes in the weld process, such as changes in the transmitted laser beam power, quality or positioning of the laser beam, change the resulting weld surface features and temperature of the weld surface, thereby resulting in a change in the direction and amount of infrared emissions. This change in emissions is monitored by an IR sensitive detecting apparatus that is sensitive to the appropriate wavelength region for the hot weld surface. The weld monitor output is represented in an intuitive graphical format, in which the data is represented by a plot of voltage versus time. The infrared weld signal is monitored by one sensor integrated into the beam delivery optics, which greatly simplifies collection and analysis of the data. The infrared detector collects emissions from directly above the weld, and does not require sensors beneath the weld. Integration of the detector into the beam delivery optics makes the system very compact and less susceptible to bumping or misalignment. This monitoring concept has been incorporated into transmissive or reflective optics on both $CO_2$ and Nd:YAG lasers.

It is an object of the present invention to provide an improved method for weld monitoring.

It is an object of the present invention to provide an improved method for monitoring a laser heat treating process.

It is another object of the present invention to provide an improved weld monitoring method that provides real time monitoring of an infrared (IR) signature of a weld to identify a predetermined weld parameter, such as, surface weld quality, partial and full penetration.

It is another object of the present invention to provide an improved weld monitoring method that provides real time monitoring of an infrared (IR) signature of a weld to identify a predetermined weld parameter, such as, workpiece misalignment.

It is another object of the present invention to provide an improved weld monitoring method that provides real time monitoring of an infrared (IR) signature of a weld to identify a predetermined weld parameter, such as, workpiece contamination.

It is another object of the present invention to provide improved weld monitoring and laser heat treatment monitoring methods that utilize an infrared (IR) detector and that provide reliable and effective operation.

It is another object of the present invention to provide such an improved weld monitoring and laser heat treatment monitoring methods that overcome many of the disadvantages of prior art arrangements.

SUMMARY OF THE INVENTION

In brief, these and other objects of the invention are provided by improved methods for weld monitoring and improved methods for laser heat treatment monitoring.

In the method for weld monitoring, an infrared (IR) signature emitted by a hot weld surface during welding is detected. The detected infrared signature is compared with a steady state infrared signature signal. The compared results are correlated with a predetermined weld parameter. The predetermined weld parameter includes at least one of a full penetration weld, a workpiece misalignment, and a workpiece contamination. In the method for monitoring a laser heat treating process, an infrared (IR) energy signal emitted by a workpiece surface during the laser heat treating process is detected. The detected energy signal is compared with a predefined voltage range. The compared results are correlated to identify a potential defect.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, improvements are provided in the detection of full weld penetration, in misalignment of components being joined by welding, and in the detection of organic surface contamination of components being welded, such as oil contamination of the workpiece. Signals from the weld monitor contain AC and DC components. With full penetration the signals change significantly. When parts are misaligned the DC signal shows a sinusoidal variation. Oil contamination shows up as a characteristic noisy variation in both AC and DC signals.

Figure 1:
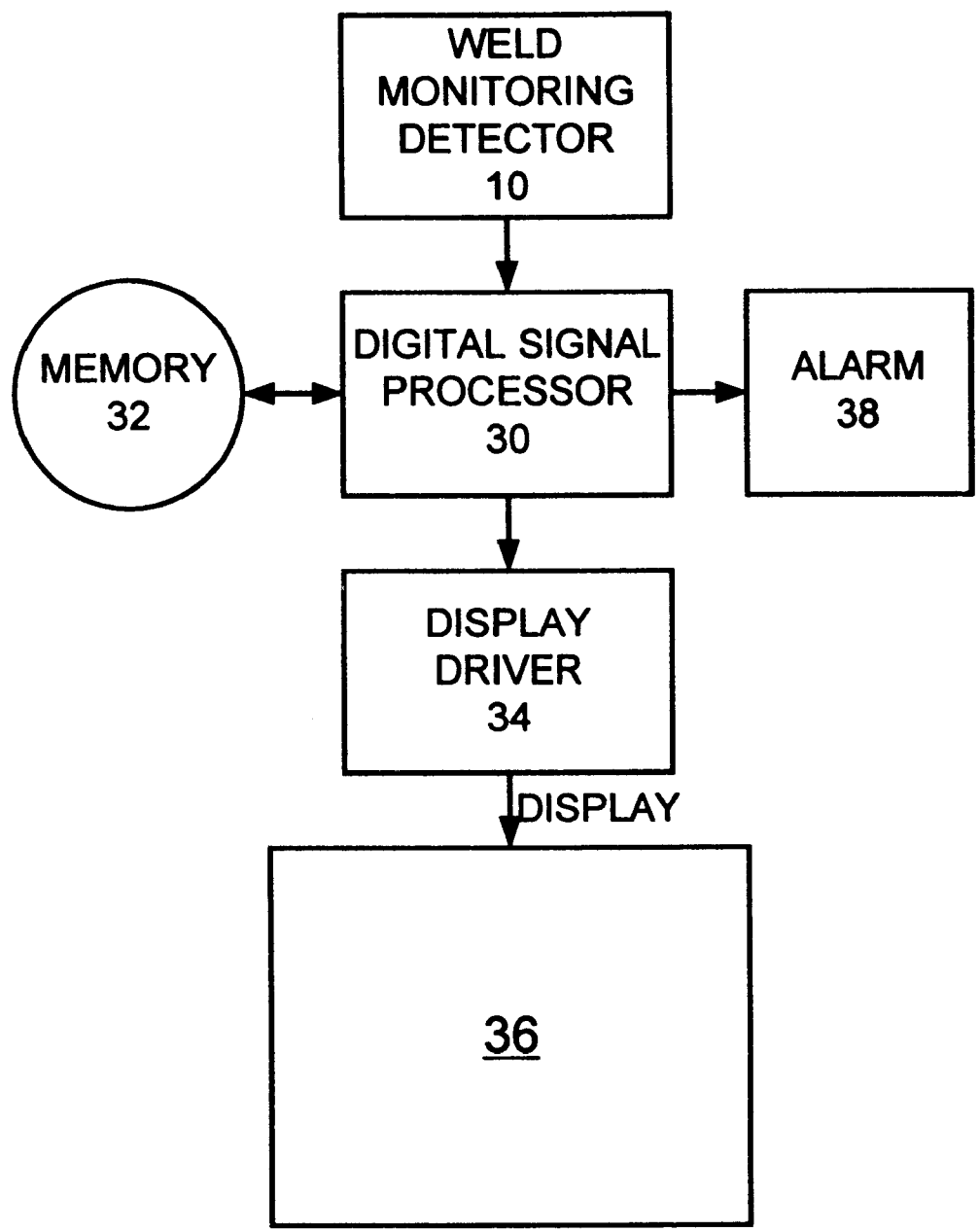
FIG. 1 is a block diagram representation of a monitoring system arranged in accordance with the present invention.

Referring to FIG. 1, an output signal of a weld monitoring detector 10 is applied to a digital signal processor (DSP) 30 that has an associated memory 32. A display driver 34 operatively controlled by the DSP 30 provides a display signal to a display 36 that can be viewed by a user of the weld monitoring detector 10. An alarm 38 is coupled to the DSP 30 for generating an alarm, such as an audible signal to alert the user of the weld monitoring detector 10 or activating a relay to identify or divert a potentially bad part.

The weld monitoring detector 10 and monitoring system of FIG. 1 advantageously are implemented as disclosed in the above-identified U.S. Pat. No. 5,674,415. The subject matter of the above-identified patent is incorporated herein by reference.

Figure 2:
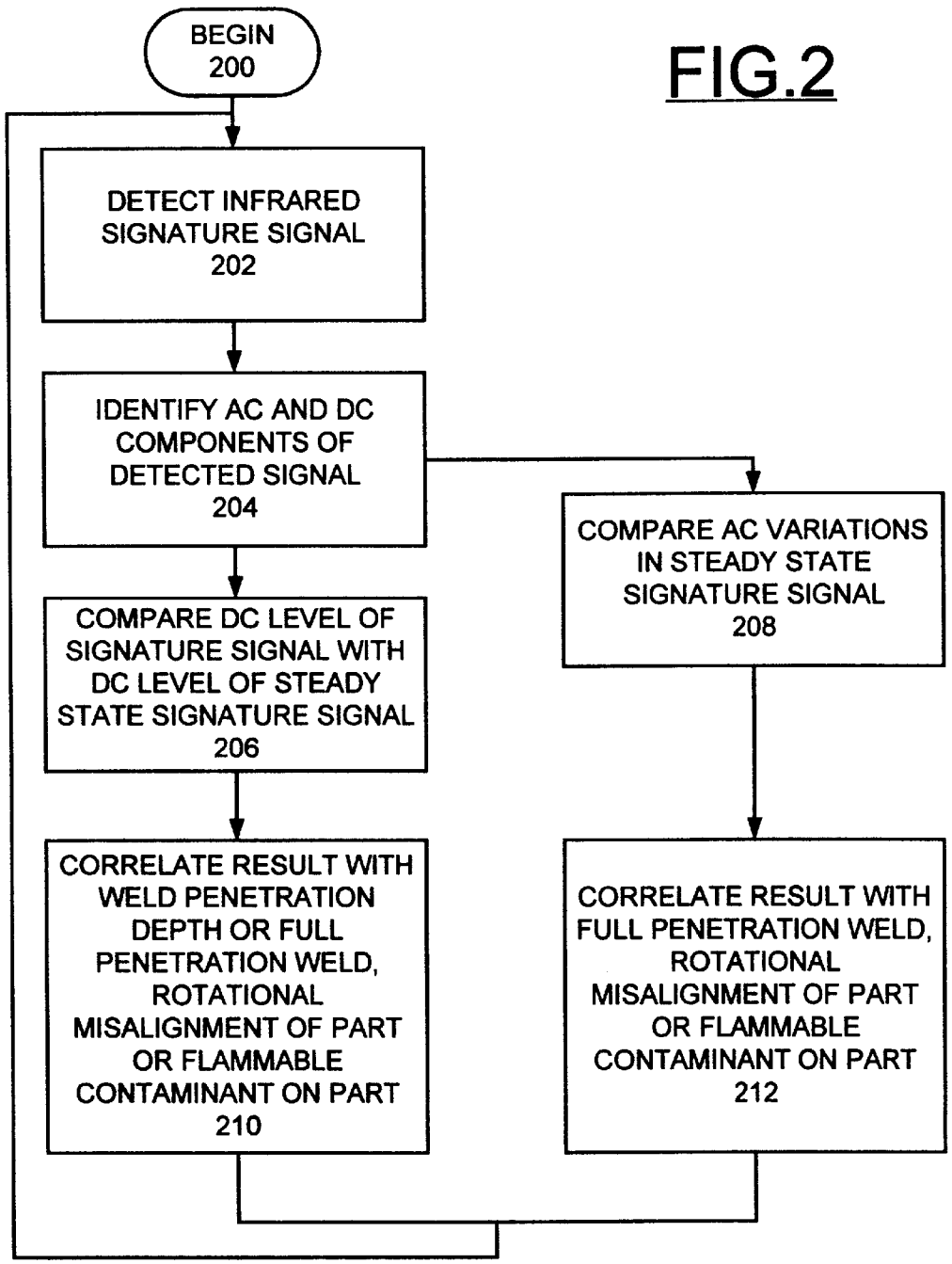
FIG. 2 is a flow chart illustrating sequential weld monitoring functions performed by the monitoring system of FIG. 1.

Referring to FIG. 2, sequential weld monitoring functions performed by the DSP 30 are shown beginning at a block 200. An infrared signature signal is detected as indicated at a block 202. Then the AC and DC components of the detected signal are identified as indicated at block 204. The detected infrared signature signal including the identified AC and DC components of the detected signal are compared with a steady state infrared signature signal of the weld pool as indicated at blocks 206 and 208. Then the compared results are correlated to identify a weld penetration depth or full penetration weld as indicated at blocks 210 and 212. The compared results also are correlated to identify the full penetration weld, rotational misalignment of the part and contaminant of the workpiece at blocks 210 and 212.

Figure 3:
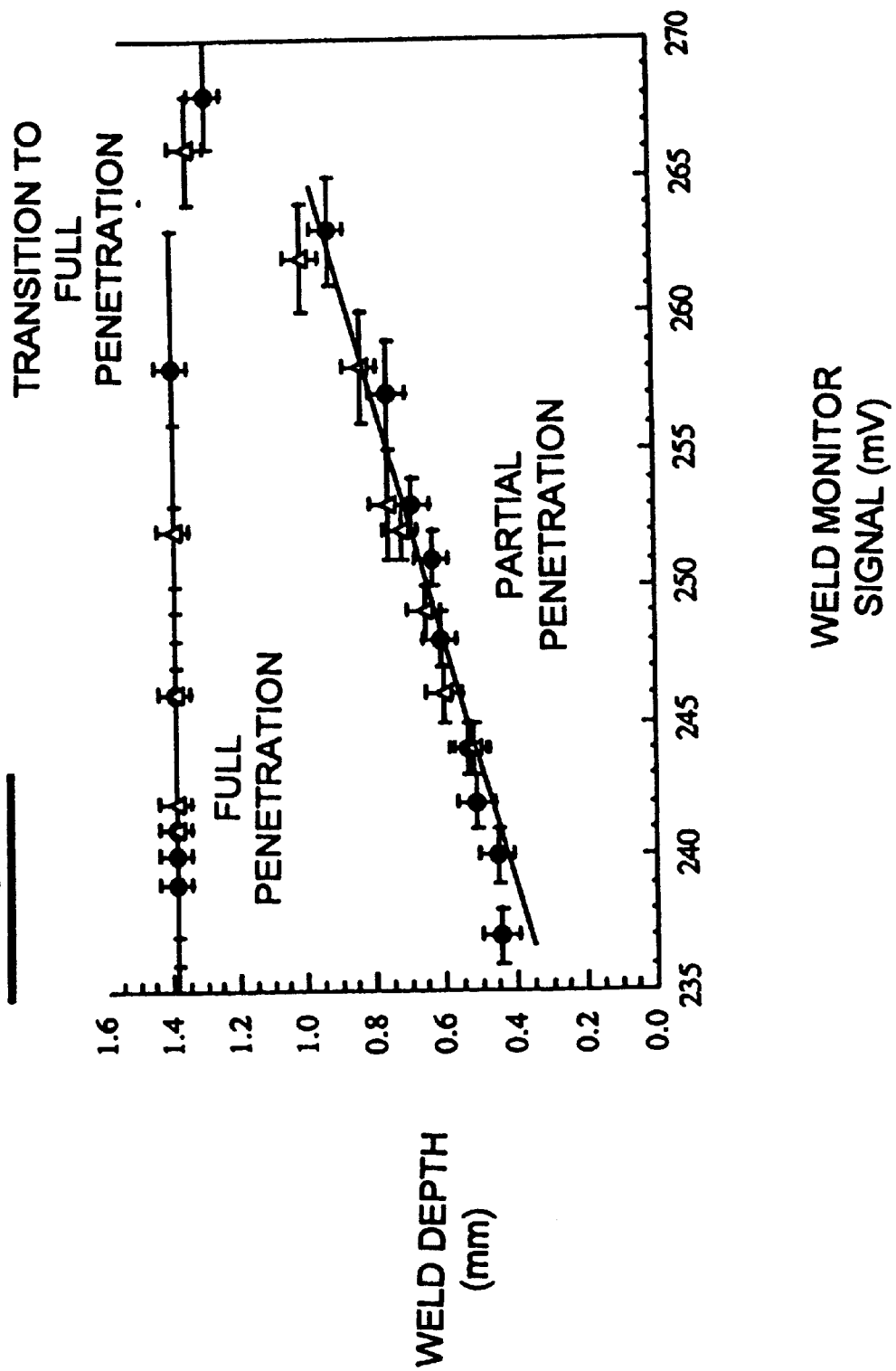
FIGS. 3, 4A, 4B. 5, 6A, 6B, 7, 8, 9, 10A, 10B, 11, 12A, 12B, 13A, 13B, and 13C are diagrams illustrating weld monitoring operations of the monitoring system of FIG. 1 in accordance with the e present invention.
Figure 4A:
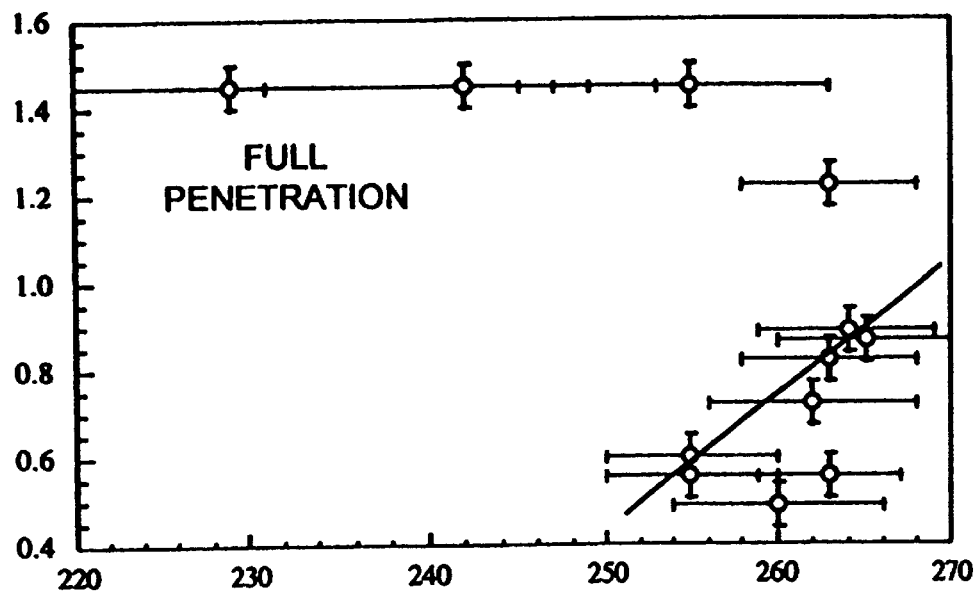
Figure 4B:
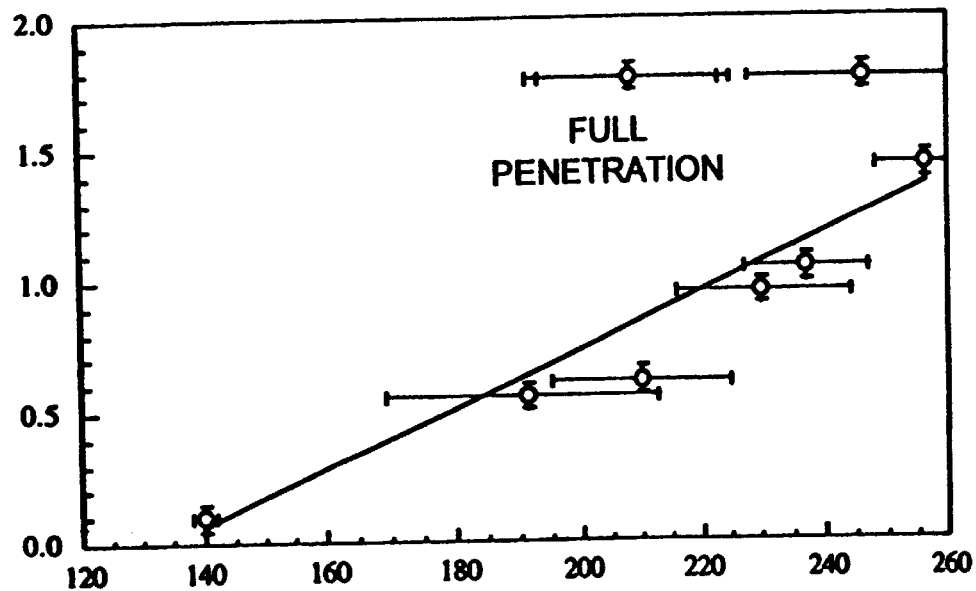

FIGS. 3, 4A, 4B. 5, 6A, 6B, 7, 8, 9, 10A, 10B, 11, 12A, 12B, 13A, 13B, and 13C illustrate weld monitoring operations of the monitoring system of FIG. 1 in accordance with the present invention.

Figure 5:
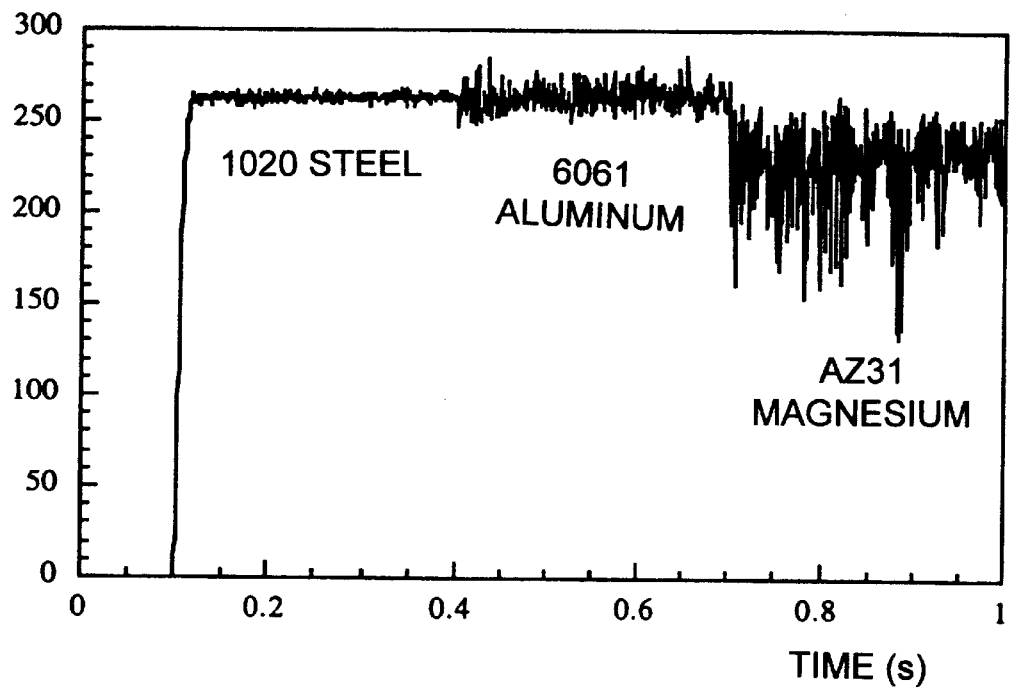
Figure 6A:
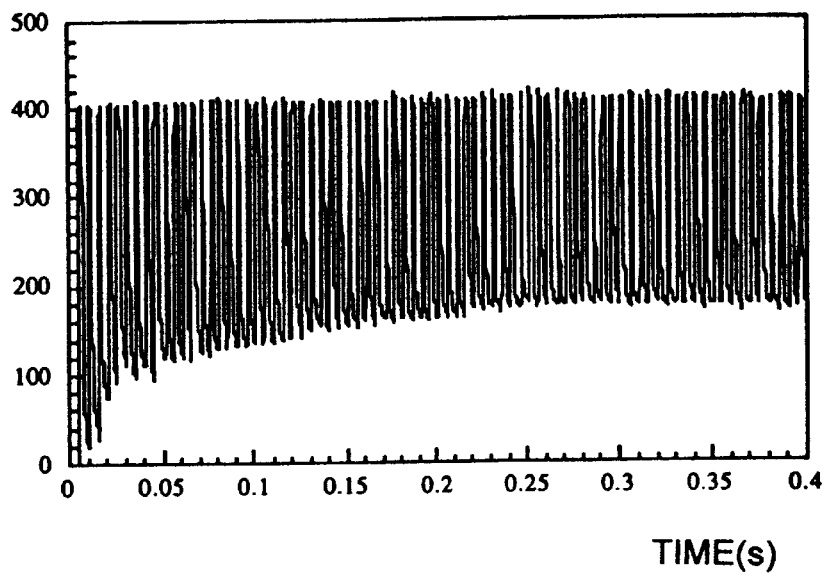
Figure 6B:
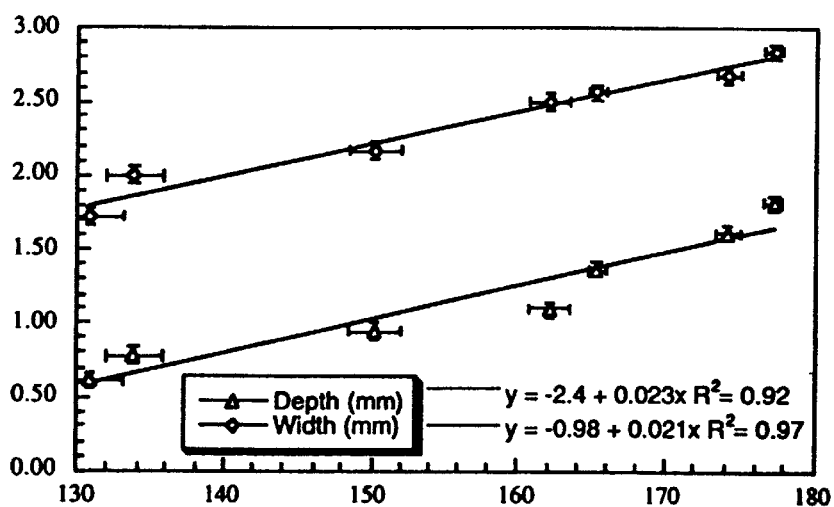
Figure 7:
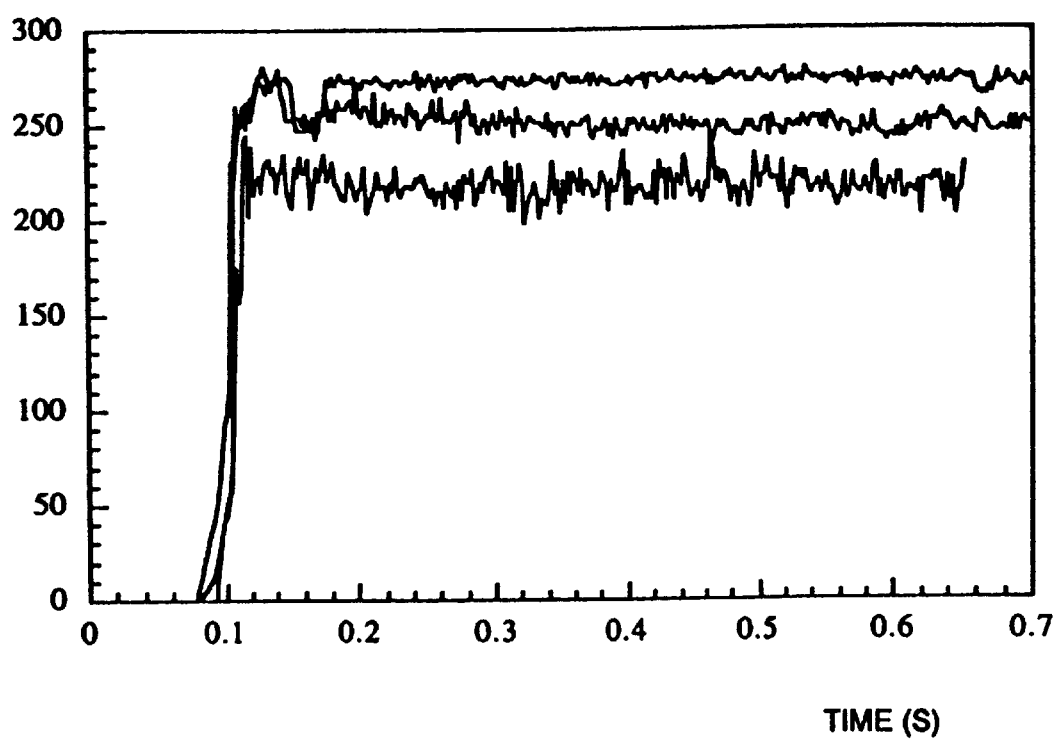
Figure 8:
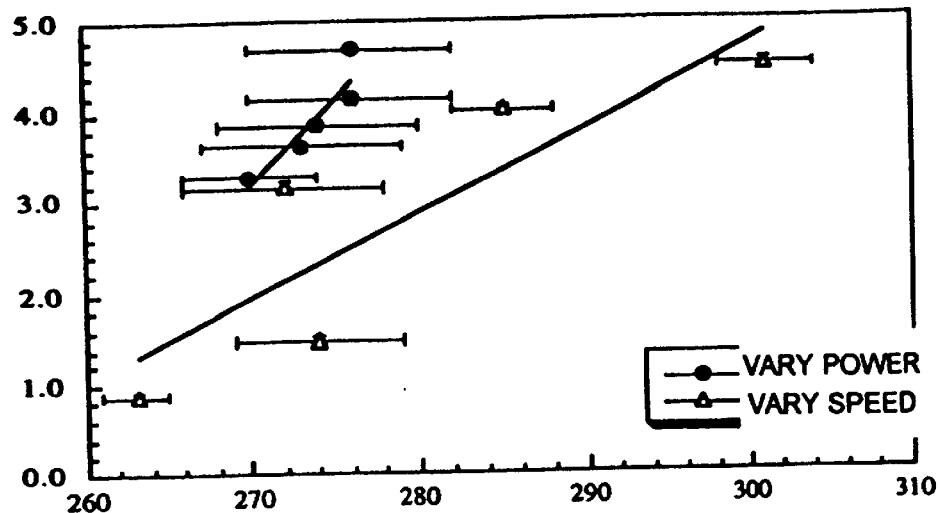
Figure 9:
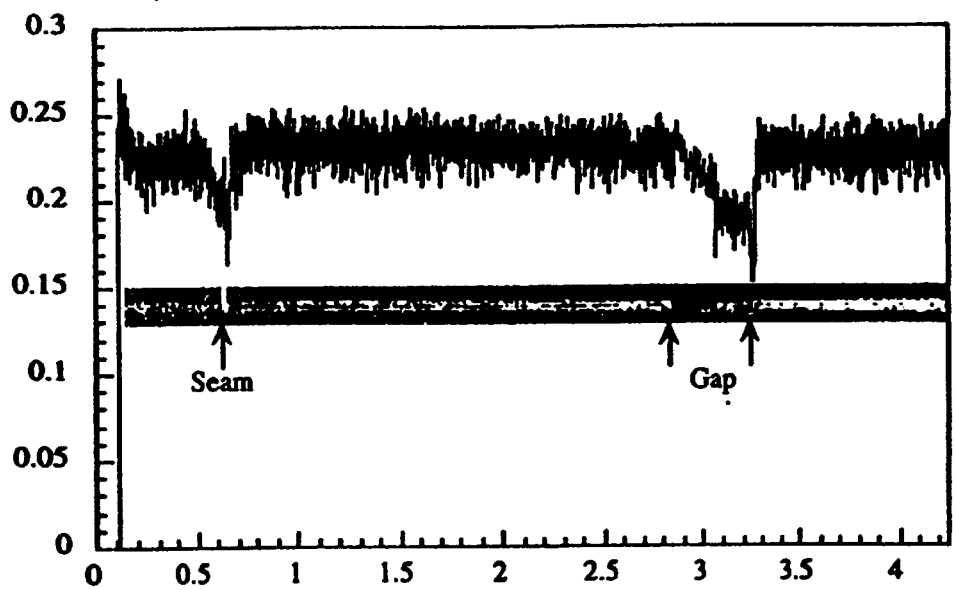

FIG. 3 illustrates the weld depth (vertical axis) relative to the weld monitor signal (horizontal axis). FIG. 3 illustrates both a full penetration weld and a partial penetration weld. FIGS. 3, 4A and 4B illustrate correlation between weld monitor DC level and penetration depth for bead on plate welds made with a $CO_2$ laser on 1020 steel (FIG. 3), 6061 aluminum (FIG. 4A), and AZ31B magnesium (FIG. 4B). The steel and aluminum penetration were increased by decreasing the travel speed, while the magnesium penetration was increased by increasing the power. The two sets of data shown in FIG. 3 were collected 7 days apart to illustrate the weld monitor repeatability. FIG. 5 illustrates differences in the weld monitor signal for 1020 steel, 6061 aluminum, and AZ31B magnesium. For all bead on plate $CO_2$ laser welds, the penetration depth was =1 mm and the travel speed was =13 cm/s. The power was 3.7 kW for the steel and aluminum and 1.2 kW for the magnesium. FIGS. 6A and 6B illustrate weld monitor signal (FIG. 6A) and weld monitor signal correlation with weld depth and width (FIG. 6B) for bead on plate Nd: YAG laser welds on 1045 steel. The weld monitor signal plotted in FIG. 6B was from the lower bound of the AC signal in FIG. 6A or the pedestal portion. The penetration was varied by changing the travel speed at constant power. FIG. 7 illustrates AC fluctuations of weld monitor signal for bead on plate $CO_2$ laser welds. The top signal is a partial penetration weld at 13 cm/s and 4.3 kW, the middle signal is a full penetration weld at 13 cm/s and 4.9 kW, and the bottom signal is a full penetration weld a 6 cm/s and 3.7 kW. FIG. 8 illustrates weld depth as a function of weld monitor DC signal obtained by changing travel speed at constant power and power at constant travel speed for deeper bead-on-plate welds made in 1045 steel with the $CO_2$ laser. Both curves show a positive trend between the weld monitor output and penetration, although the correlation is not as strong as at lower penetration depths. FIG. 9 illustrates an image of a $CO_2$ butt weld in 1020 steel with simulated defects along with the corresponding weld monitor signal. Drops in the weld monitor output correspond with a seam and gap in the butt weld.

Figure 10A:
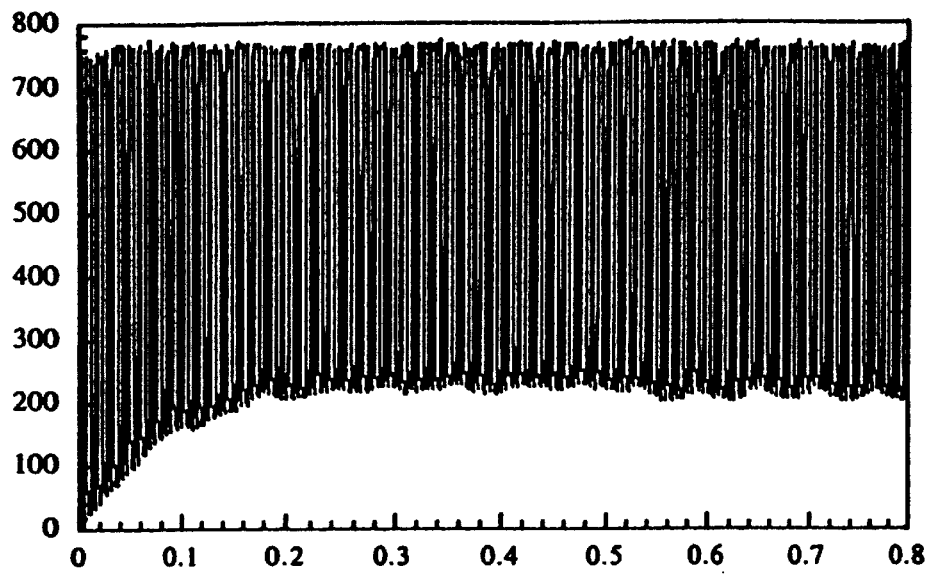
Figure 10B:
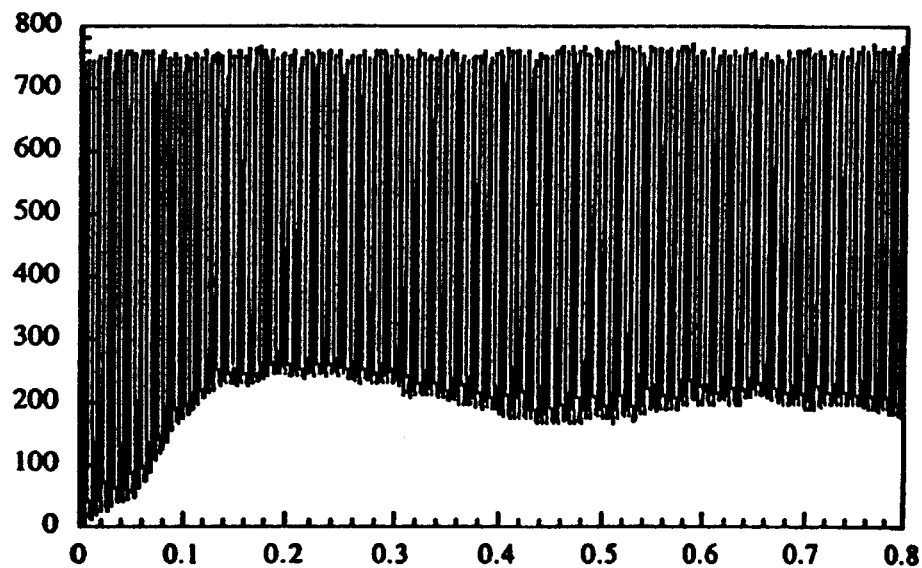
Figure 11:
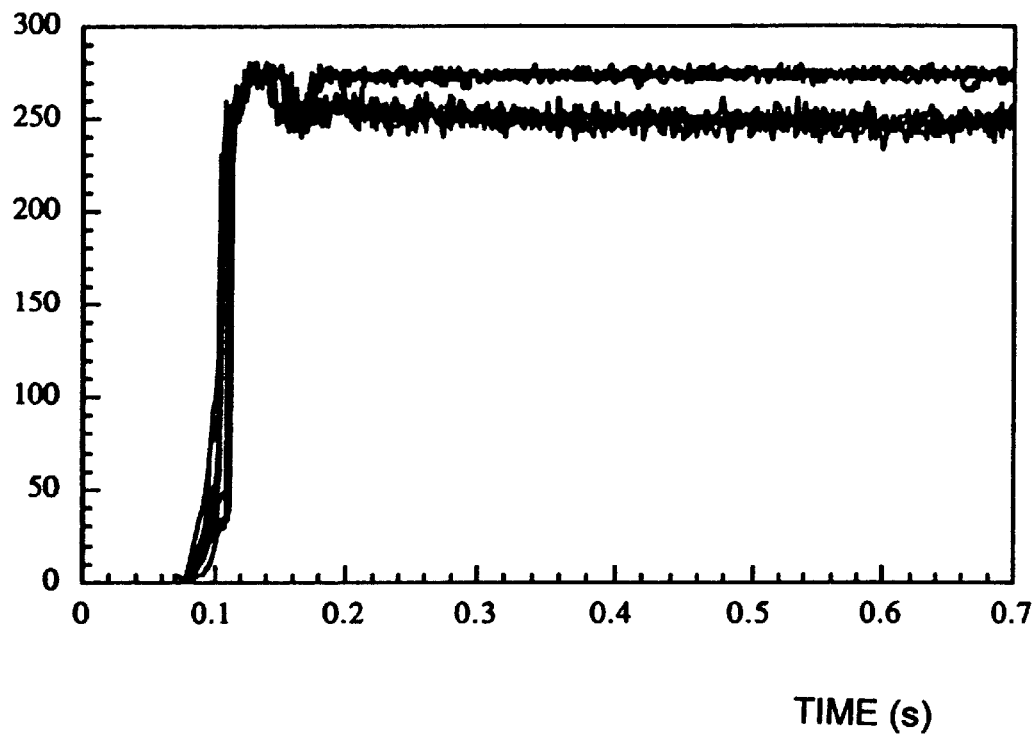

FIGS. 10A and 10B illustrate a weld monitor signal from a Nd:YAG laser weld of a cylindrical fillet joint showing the difference between the weld monitor signals from axially aligned parts in FIG. 10A and misaligned parts in FIG. 10B. FIG. 11 illustrates repeatability of weld monitor output for full and partial penetration bead-on-plate $CO_2$ laser welds on 1020 steel. The plot contains data from 5 partial penetration welds (top) and 5 full penetration welds (bottom). Penetration was varied by changing the power at constant travel speed.

Figure 12A:
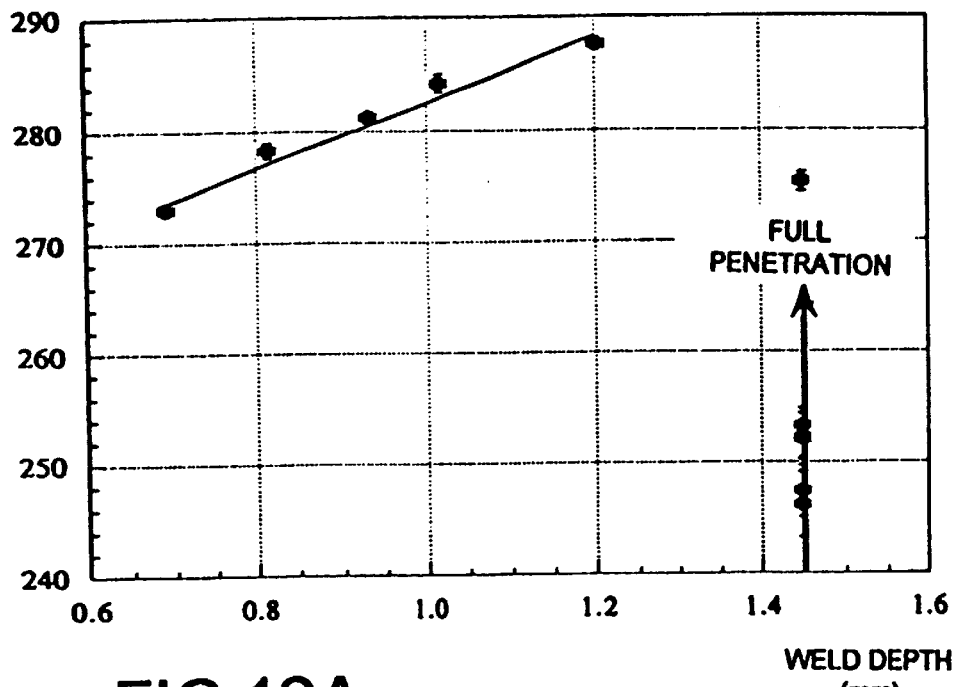
Figure 12B:
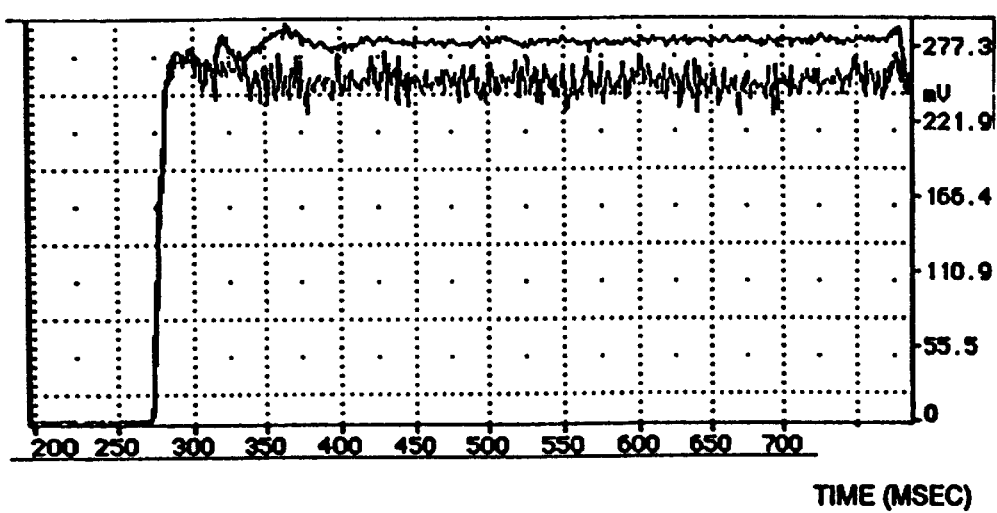

FIGS. 12A and 12B illustrate variations in the weld monitor signal with changes in weld penetration. On the left side of FIG. 12A, the weld monitor output (in millivolts) is seen to increase with increasing penetration (in millimeters). Once full penetration is reached (the sheet is 1.45 mm thick), there is an easily recognizable discontinuity in the level of the signal. The one data point above the arrowhead depicts the impact of intermittent full penetration, in which the weld conditions are such that full penetration is just barely possible. In FIG. 12B, the differences in the weld monitor signal with penetration are visible. The full penetration signal has a lower DC level and is noisier.

Figure 13A:
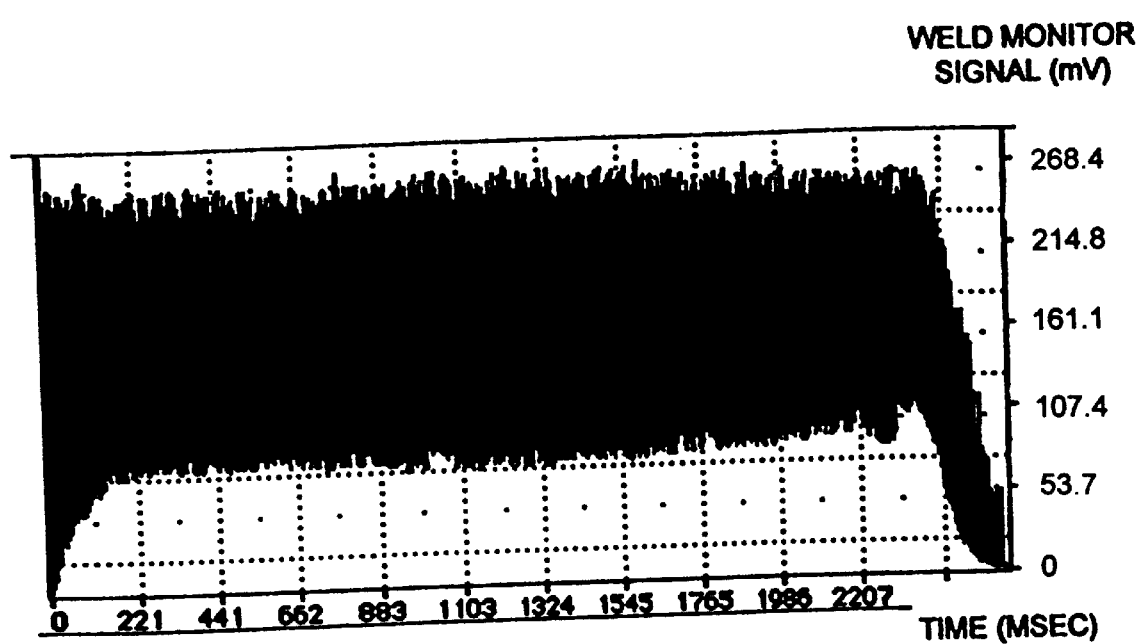
Figure 13B:
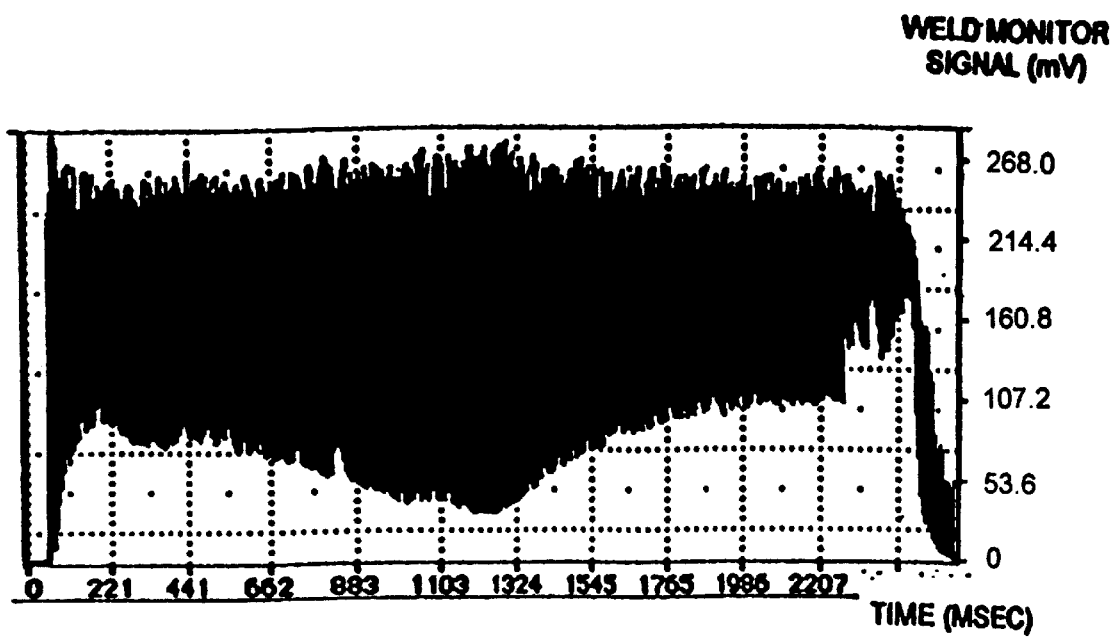
Figure 13C:
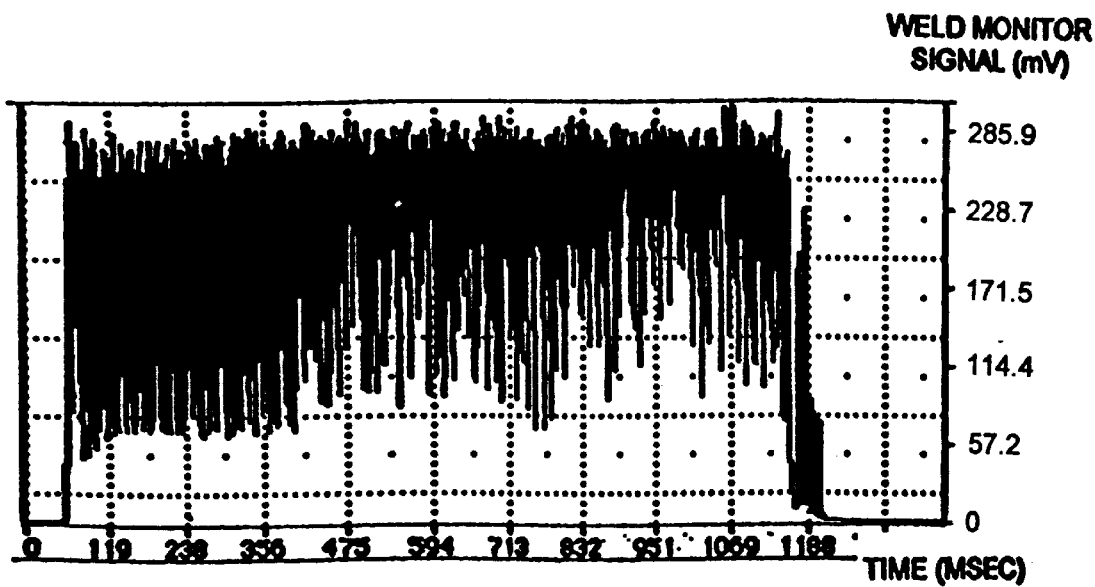

FIGS. 13A, 13B and 13C illustrate weld monitor signal from a circumferential weld made by a pulsed Nd:YAG laser, in which the primary area of interest is the DC or lower level of the signal. A normal, flat signal is shown in FIG. 13A. Variation in the DC level caused by misalignment between the rotary axis and the part axis is shown in FIG. 13B. The noisy variation caused by oil on the part is observed in FIG. 13C.

Experimental Methods

Welds were made at travel speeds between 5 and 15 cm/s with a 6 kW CW $CO_2$ laser (Rofin Sinar RS6000) using a near TEM20 (M2=4.1) and a 150 mm off-axis parabola. The focused beam diameter was determined by a Prometec laser beam analyzer to be 400 $\mu$m (containing 86% of the beam energy). The power was varied from 0.5 to 5.5 kW to produce mean irradiances ranging from 0.25 to 3.5 $MW/cm^2$. The mean irradiance corresponds to the ratio of 86% of the power over the measured cross-sectional area. Bead-on-plate welds with focus on the surface were made on the steel sheet and plate stock (1020 and 1045) as well as aluminum (6061) and magnesium (AZ31) sheet. Top gas shielding was provided by a 50 lpm flow of helium in a trailing jet configuration delivered by a 0.5 cm diameter tube oriented at 45° from the surface and 1 cm from the weld.

Additional welds were made on a pulsed 1.6 kW Nd:YAG laser (Electrox) with a 1000 $\mu$m fiber and a 75 mm transmissive focusing optic. Bead-on-plate welds were made on 1045 steel at travel speeds ranging from 1.5 to 5 cm/s. The average power was 1.2 kW (3.75 kW peak) at the work piece, in which the pulse width was 1.6 ms and the repetition rate was 200 Hz. The beam diameter was 600 $\mu$m, which produced a mean peak irradiance of 1.3 $MW/cm^2$. Circumferential lap fillet welds were made on stainless steel at 60 rpm with an average power of 0.3 kW (1.7 ms pulse width and 190 Hz repetition rate). Top gas shielding was provided by a 40 lpm flow of argon in a trailing jet configuration delivered by a 0.8 cm diameter tube oriented at 45° from the surface and 1 cm from the weld.

For both lasers, infrared weld monitors were integrated into the beam delivery optics. This implementation is stable and inconspicuous, eliminating the need for alignment or changes in the welding process. The $CO_2$ weld monitor utilizes a scraper mirror located on the lower corner block mirror, while the YAG assembly uses oversized, off-axis optics to collect the weld signal. The signal to noise of the $CO_2$ implementation can be improved by using a larger collecting optic as for the case of the YAG implementation. Weld monitor voltages as a function of time were collected using data acquisition hardware and software (GW Instruments, Somerville, MA) with an Apple Macintosh computer. The data collection rate was between 500 and 2000 Hz. The weld monitor system noise (standard deviation) when not welding was 0.25 mV, while the AC variation due to welding ranged from 1 to 15 mV. Filtering may be used to reduce the noise level of the data, but some information may be lost in this process. After welding, the steel, aluminum, and magnesium coupons were sectioned, polished, and etched to determine weld depth, width, and surface profile.

Experimental Results

The results are divided into three sections. In the first, the dependence of the weld monitor output on penetration depth is described. The penetration section addresses partial penetration, full penetration, and deeper penetration welds. The second part demonstrates the sensitivity of the weld monitor to defects caused by part misalignment and surface contamination. The third section describes the repeatability of the weld monitor signal and the use of the weld monitor for process control.

Penetration

The energy input per unit length of the weld was increased by increasing the laser power at constant speed or decreasing the travel speed at constant power. The increased energy input led to increased penetration and higher infrared emissions from the weld pool.

Referring to FIGS. 3 and 4B, a nearly linear relationship was observed between the weld monitor signal and the weld penetration depth in steel and magnesium. Many researchers have noted the increase in the weld monitor signal with increasing power or decreased travel speed, the present invention correlates the weld monitor signal with weld penetration. The penetration was varied both by changing the travel speed (steel) and the power (magnesium). The correlation between the weld monitor signal and the penetration was weaker for the aluminum (FIG. 4B), due to a combination of lower sensitivity in the DC level with penetration and a higher AC component.

In FIG. 5, variations in the weld monitor signal with material type (steel, aluminum, and magnesium) are shown. All penetration depths were approximately 1 mm, and the travel speeds were 13 cm/s. The power was 3.7 kW for the steel and aluminum and 1.2 kW for the magnesium. The AC variation increased dramatically from the steel to the aluminum and magnesium. These changes may be related to greater keyhole stability in molten steel. Factors aiding keyhole stability in steel include higher absorptivity, and the higher viscosity and surface tension of the molten metal as set forth in the following Table 1. Opening and closing of the keyhole and spatter in aluminum and magnesium may contribute to the oscillations in the weld monitor signal. The beam powers used to achieve the penetration in the three different metals are consistent with the energy needed to melt each metal. Differences in absorptivity and thermal conductivity also affected the results. However, the DC levels of the aluminum and magnesium are similar to the steel even though the melting point of steel is significantly higher as shown in Table 1 below. It appears that the weld monitor output does not necessarily correlate with the temperature of the weld.

TABLE 1

Comparison of Physical Properties of Magnesium, Aluminum, and Iron

| Property | Magnesium | Aluminum | Iron | Ref. |
|---|---|---|---|---|
| Melting point (° C.) | 650 | 660 | 1536 | 10 |
| Density (g/cm$^3$) | 1.74 | 2.70 | 7.86 | 10 |
| Heat of fusion (J/g) | 368 | 396 | 274 | 10 |
| Specific heat (J/g ° C.) | 0.92 | 1.05 | 0.46 | 10 |
| Energy to melt (J/cm$^3$) | 1650 | 2900 | 7650 | |
| Absorptivity(%@10.6 $\mu$m) | 3 | 5 | 10 | 11 |
| Viscosity (mPa s@$T_{mp}$) | 1.25 | 1.3 | 5.5 | 10 |
| Surface tension (N/m @ $T_{mp}$) | 0.55 | 0.90 | 1.87 | 10 |

TABLE 1-continued

Comparison of Physical Properties of
Magnesium, Aluminum, and Iron

| Property | Magnesium | Aluminum | Iron | Ref. |
|---|---|---|---|---|
| Thermal Conductivity at melting point ($Wm^{-1}k^{-1}$) | 330 | 210 | 30 | 10 |

The weld monitor output from a pulsed YAG laser is shown in FIG. 6A. The weld monitor signal consists of essentially two levels which will be termed the upper bound and the lower bound. The upper bound of the signal occurs during the actual pulse and originates from the heating of the material and formation of plasma. Due to rapid thermal relaxation, this signal quickly decays to the lower bound after the pulse ends. This upper level of the signal is not due to reflection of the YAG beam, since it is still observed when the beam is tilted. In addition, a notch filter with an optical density of 5 at the YAG wavelength is installed in front of the weld monitor. The lower bound of the signal was related to the weld pool temperature and the penetration depth. The gradual formation of the weld pool was indicated by the rise of the lower bound of the signal during the first 0.2 s of the weld, after which the signal stabilizes. FIG. 6B shows the change in weld monitor signal with increasing depth and width of the weld. The weld penetration was changed by varying the travel speed at constant pulse parameters and average laser power, since it was difficult to vary the power without changing the pulse characteristics significantly. As the weld dimensions increase, the weld monitor signal increased, consistent with the CW $CO_2$ results above. The high R-squared values indicate the quality of the fit.

An abrupt drop in the weld monitor signal was observed when full penetration was achieved (FIGS. 3, 4A and 4B). In all three materials, the weld monitor signal showed an increasing trend with increasing penetration until full penetration is reached. When the keyhole goes completely through the material, energy lost on the bottom side of the work piece is increased. The data in FIGS. 3 and 4B indicates a drop in DC level of the signal from 10% to 18% for steel to magnesium, respectively. This has been observed by researchers who used sensors beneath the weld in their monitoring schemes. They have measured significant signals on the bottom during full penetration welding, and it appears that the top signal was correspondingly reduced. In the transition region between partial and full penetration, the DC level of the weld monitor signal is highly variable and decreases from the partial penetration maximum to the full penetration minimum.

Higher AC components in the weld monitor signal are generally related to greater keyhole instability. Increased variation in the AC component of the weld monitor signal was observed when the keyhole fully penetrated the work piece and at slower travel speeds.

As shown in FIG. 7, when full penetration is obtained by increasing the power, the AC variation is slightly increased over a partial penetration weld at the same speed. However, if full penetration is achieved by decreasing the travel speed, the AC component of the weld monitor signal is increased due to both full penetration and slower travel speed (FIG. 7). The average AC variations for 5 welds made at each of the conditions in FIG. 7, as measured by the standard deviation, are shown in the following Table 2. These AC variations are consistent with all the steel data collected. A minimum AC variation of 1 mV was obtained with shallow welds in steel at high speeds, while the maximum variation in steel is observed both at full penetration and slow travel speeds or with deeper penetration welds (=5 mm).

TABLE 2

AC Variation (Standard Deviation) in Weld
Monitor Signal with Travel Speed and Penetration

|  | Partial Penetration | Full Penetration | Full Penetration |
|---|---|---|---|
| Weld parameters | 13 cm/s, 4.3 kW | 13 cm/s, 4.9 kW | 6 cm/s, 3.7 kW |
| AC variation (mV) | 1.9 ± 0.2 | 3.5 ± 0.3 | 7.0 ± 0.6 |

FIG. 8 illustrates the impact of deeper penetration on the weld monitor output. Both increased power at constant speed and decreased speed at constant power were used to obtain the data in the plot. For the curve in which the power was increased, the weld monitor signal showed a linear correlation with depth up to a penetration of 4.2 mm. Considering the AC noise level at this penetration, accurate prediction of penetration is not as practical as at lower penetration levels. At penetrations over 4.2 mm, no increase in DC level was obtained. The data indicates that there is a decrease in sensitivity of the infrared signal with larger weld penetrations. The monitoring technique is more sensitive at weld penetrations less than 2 mm and does not appear to be able to discriminate variations in penetration over 4 mm. In the case of varying the speed, a larger change in the weld monitor signal with penetration was observed. However, as the speed was reduced, the weld width increased from 1.5 to 4.5 mm. This increase in the area from which the infrared signal originates will increase the collected signal in the same manner as an increase in penetration. However, the linear correlation was not as good as for the case of the shallower welds.

Seams and gaps in butt welds were easily recognized in the weld monitor output.

FIG. 9 is an image of the weld made with simulated defects along with a plot of the weld monitor signal corresponding to this weld. On the left there was a seam between two pieces of metal on the top side of the butt weld. This seam produces a drop in the weld monitor signal, and this drop would increase in duration as the gap between the two pieces increased. On the right side of this butt weld, there is a gap caused by poor fit-up. This also produced an abrupt drop in the weld monitor signal, indicating incomplete bonding of the material.

In FIGS. 10A and 10B, the effects of rotary misalignment are demonstrated. Circumferential fillet welds were made both with the part coincident (FIG. 10A) and skewed (FIG. 10B) from the rotary axis. The primary difference between the two plots is the oscillatory nature seen in the bottom portion of the weld monitor signal. This waviness was caused by the movement of the weld bead on and off the step between the two pieces of metal to be welded. Ideally, the beam would travel along the seam between the two parts. The smaller bumps on the signal in FIG. 10A were the result of surface imperfections on the weld bead.

Repeatability and Process Monitoring

For robust monitoring, the signals produced for a specified set of process parameters should be precise and reproducible. Signal variability should be low for precision and correctness in identification of defects. Data was obtained to determine the capability of the weld monitor for process monitoring. Variations between the weld monitor signals from individual welds made on the same day is shown in FIG. 11. FIG. 11 shows five partial penetration welds (higher DC level) and five full penetration welds (lower DC level). The reason for the drop in the DC level with full penetration was noted above. All the weld monitor traces for both conditions lie on top of each other illustrating the repeatability of the weld monitoring technique. The weld parameters for the welds in FIG. 11 are given in the first two columns of Table 2. For the five partial penetration welds, the average DC level was 271±1 mV, while the average DC level of the five full penetration welds was 249±3 mV. As expected, the range of average DC levels lie within the average of the AC variation (Table 2). The small dip at the start of each weld resulted from a gap between a piece of scrap and the plate to be welded, consistent with the sensitivity of the weld monitor to fit-up defects.

Welds made on 1020 steel one week apart were sectioned to test the stability of the correlation between the weld monitor signal and the weld penetration depth (FIG. 3). The data from both weeks lie along the same correlation curve, indicating the stability of the sensor. The weld monitor output is a reliable predictor of penetration, especially if the achievement of partial or full penetration is the primary concern. For shallow weld penetrations (<2 mm), the technique is capable of discriminating changes in weld depths of 0.1 mm.

The signal from the weld monitor consists of a DC voltage modulated by an AC component. The magnitude and frequency of change in the signal indicates penetration depth, weld defects, and surface contamination. Many commercially available data acquisition and analysis packages are available for analyzing the weld monitor output.

To determine weld penetration from the weld monitor signal, a calibration curve is required. This curve can be constructed for a particular component from test welds made by varying the laser power level at constant speed. Defects are often caused by changes in beam power and part geometry rather than speed. After sectioning and polishing, the weld penetration can be measured and correlated with the DC signal from the weld monitor. Using the design specifications for the component of interest, upper and lower control limits could be determined for process monitoring.

If determination of a calibration curve is too difficult or costly, statistical methods can be used to establish the control limits. Weld monitor signals can be collected from a statistically significant number of welds, and this data can be used to establish an envelope of process conditions in which acceptable welds are produced. It is particularly easy to distinguish between partial penetration and full penetration welds, since there is an abrupt drop in the infrared signal emitted above the weld when full penetration is achieved.

Detailed tests of the infrared weld monitor technique show that it is viable as a process monitor. The simplicity, low cost, and functionality makes it ideal for process monitoring in the manufacturing environment. In particular the simple analog output can be easily analyzed for weld penetration, weld surface quality, and surface contamination with mistagging of good welds minimized. Weld tests have also been obtained on automotive components with similar success. However, as with any technique, there are limitations in applicability. The precision of this particular infrared technique decreases with penetration and is limited to weld penetration<5 mm.

Referring to FIGS. 12A and 12B, additional experimentation with the weld monitor has identified variations in the weld monitor signal with several other characteristics of the weld process. Consistent with earlier observations, the DC level of the weld monitor signal increases with increasing weld penetration. However, when the weld fully penetrates the material (the weld exits the other side of the material), the DC level of the weld monitor signal decreases abruptly (FIG. 12A). The magnitude of the signal decrease upon achieving full penetration is much greater than the typical signal variations due to normal changes in penetration or surface finish. This fact could be very useful in industrial processes in which it is desirable to consistently produce or avoid production of full penetration welds. As the weld penetration changes from partial to full penetration, the AC component becomes more significant (FIG. 12B). In particular, the AC component of an intermittent full penetration weld is the highest. All the above trends have been observed in steel, aluminum alloys, and magnesium alloys.

Referring now to FIGS. 13A, 13B and 13C, the weld monitor is also sensitive to part misalignment during welding. In the specific case of making circumferential welds on cylindrical parts using a rotary fixture, lack of concentricity between the part and fixture will cause a sinusoidal variation in the DC level of the weld monitor signal (FIG. 13B). This variation typically has a lower frequency and larger amplitude than the AC components alluded to above. Once again, this new capability should improve the reliability of an industrial process by allowing detection of misalignment and fixturing problems.

The presence of a flammable contaminant such as oil or other lubricant can also be detected by the weld monitor. The impact of surface contamination on the weld monitor signal has been observed on several occasions. The burning of a flammable substance such as oil on the work piece produced a weld signal with a higher DC level and a significantly greater AC component. The heat from weld formation ignites contaminants present near the weld, increasing both the intensity and variation in the infrared signal from the weld. This leads to an increase in both the DC and AC components of the signal whenever a contaminated location is encountered, (FIG. 13C). The protective chromate coating applied to magnesium alloys led to a reduction in the AC component of the weld monitor signal. The penetration data (FIG. 4B) was from magnesium with the protective coating, while the weld monitor signal in FIG. 5 was from magnesium with the coating removed. The standard deviation of the weld monitor signal increased from 11 to 19 mV when the coating was removed. This chromate coating on magnesium may aid in coupling the laser beam with the work piece, which is similar in function to coatings for laser heat treating of iron-based alloys. By knowing the normal variation in the weld monitor signal, differences in the work piece surface condition can easily be detected. In the factory, sensitivity to contamination should allow identification of poorly cleaned or prepared parts.

In accordance with features of the invention, the monitoring system of FIG. 1 is used for monitoring a laser beam heat treating process. The data were generated using a high power pulsed Nd:YAG laser beam which was used to treat tool steel (1045) and cast iron (3.5% carbon content). The pulse width and repetition rate of the pulsed laser beam were set to be longer and faster respectively than the thermal relaxation time of the metals treated. The irradiance (power/area) of the beam was controlled within the range prescribed for heat treating. Consequently, the results obtained, i.e. surface transformation hardening of the metal are the same as in using a continuous wave (CW) laser beam.

The data show that the same monitor system can monitor the heat treating process in several ways. The hardness is dependent on getting enough heat into the surface. The DC level output of the monitor increases monotonically with the hardness. If too much heat is input, then melting occurs which is usually not preferred for phase transformation hardening. This is sensed by the monitor by a DC voltage exceeding a certain value. Too low a voltage value indicates insufficient hardness. If the part is misaligned, a substantial voltage change in the monitor output occurs. So the quality of the heat treating process can be monitored by examining the DC voltage level. A calibration test is usually required to set the upper and lower limits of the voltage that corresponds to the acceptable range of hardness.

The monitor system of FIG. 1 adapted to laser beam heat treating is applicable to the process regardless of the wavelength of the laser used. The current method avoids the problem by using a line filter for the particular wavelength of the Nd:YAG laser. No filter is needed for the case of the $CO_2$ laser because the sensor used is insensitive to 10.6 $\mu$m. The infrared sensor used monitors the infrared energy given off by the surface which is directly correlated with the heat absorbed or the temperature of the surface. The primary parameter necessary for the required hardness and case depth is the heat absorbed provided sufficient self quenching is available. Since temperature is not sensed, no emissivity values have to be determined. The implementation of the system needs no realignment and is robust for manufacturing. As in the weld monitoring process, only a simple voltage signal has to be processed and the quality is defined within a narrow range of the voltage signal. Exceeding the range indicates a potential defect. A voltage exceeding the high limit value may lead to melting of the workpiece surface. A voltage below the low limit value may not have the required hardness. As in the weld monitoring capabilities, alignment of workpiece is also indicated by a substantial change in the monitor voltage if the part is not in position.

Figure 14:
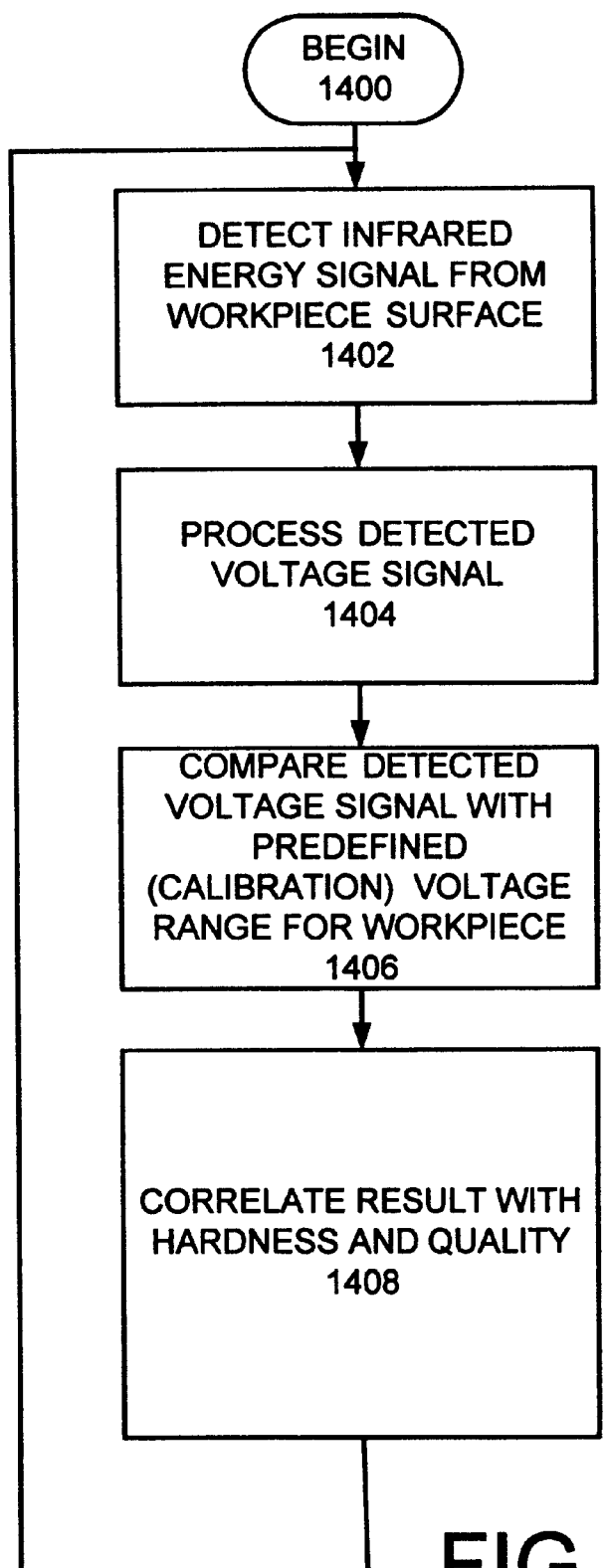
FIG. 14 is a flow chart illustrating sequential laser heat treatment monitoring functions performed by the monitoring system of FIG. 1.

FIG. 14 illustrates sequential laser heat treatment monitoring functions performed by the monitoring system of FIG. 1. In FIG. 14, an infrared energy signal from the workpiece surface is detected as indicated at a block 1402. The detected voltage signal is processed as indicated at block 1404. The detected voltage signal is compared with a predefined voltage range or calibration range for workpiece as indicated at block 1406. The result is correlated with hardness and quality is indicated at block 1408.

Figure 15:
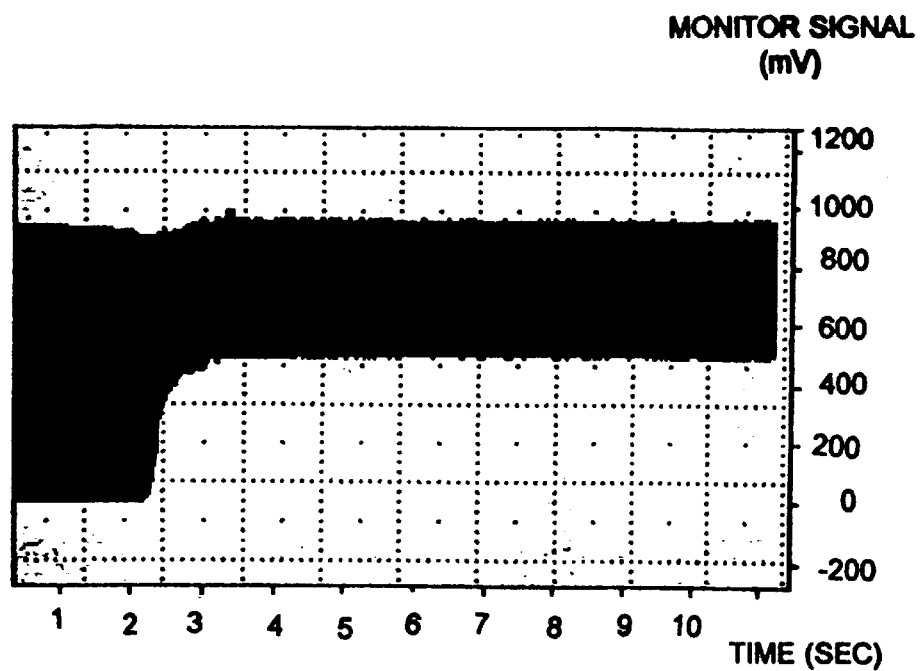
FIGS. 15–35 are diagrams illustrating laser heat treatment monitoring operations of the monitoring system of FIG. 1.
Figure 16:
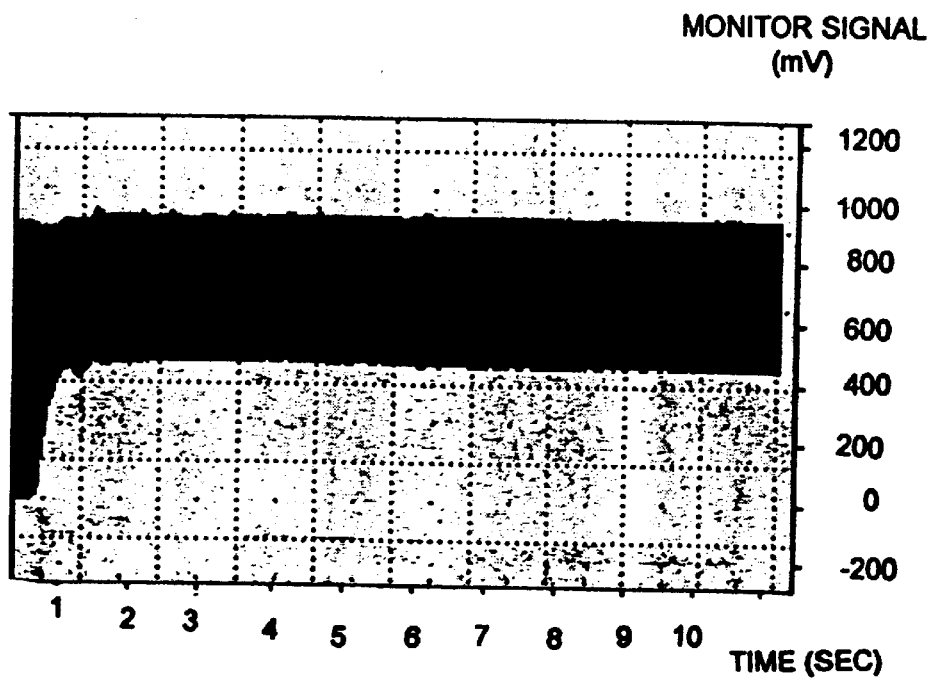
Figure 17:
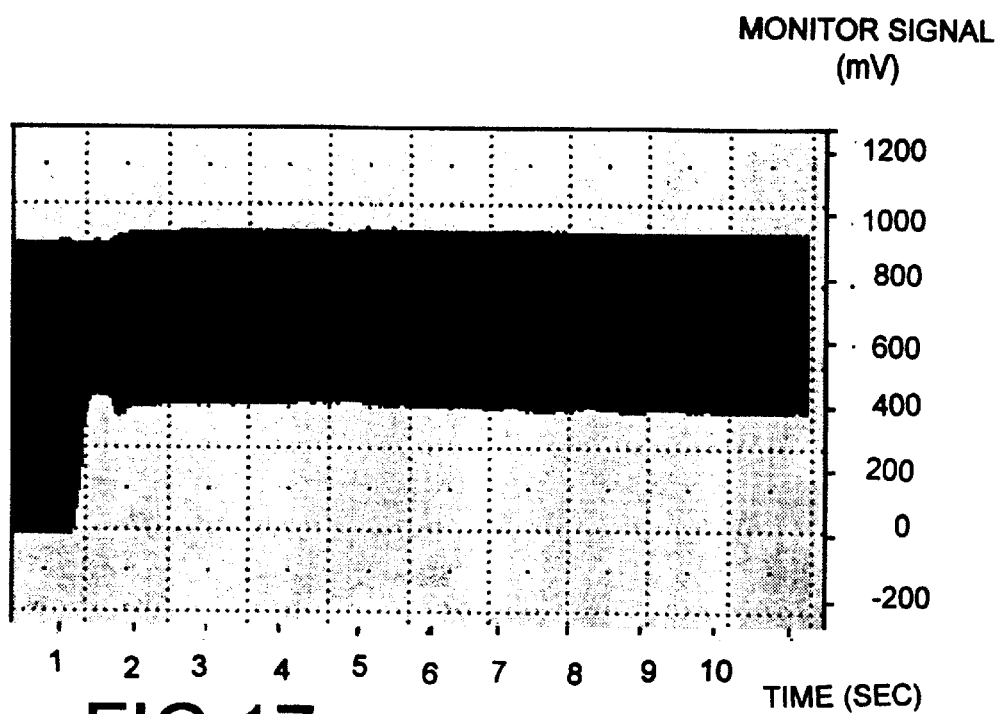
Figure 18:
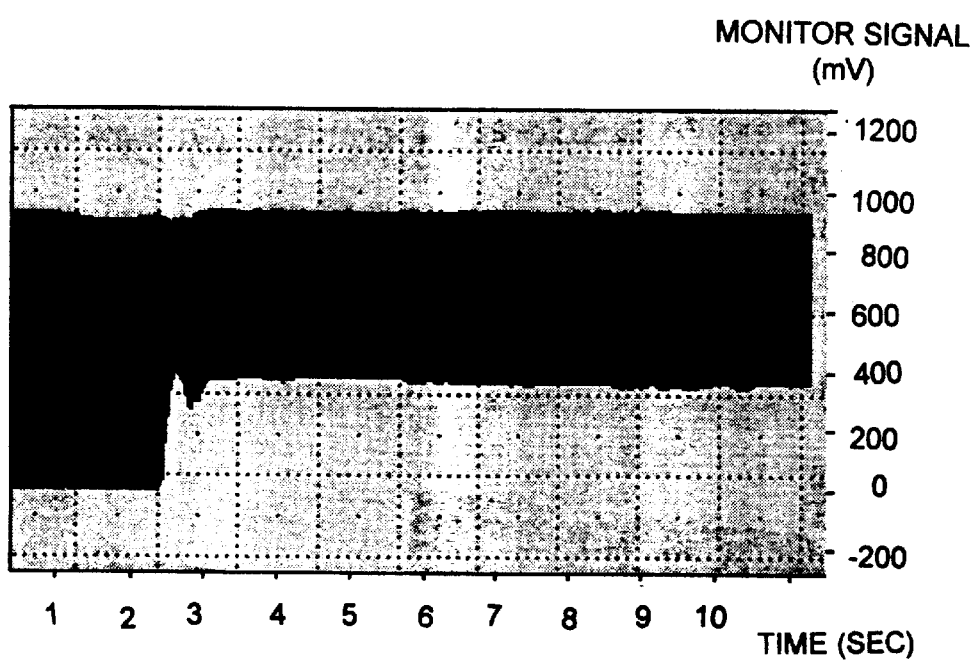
Figure 19:
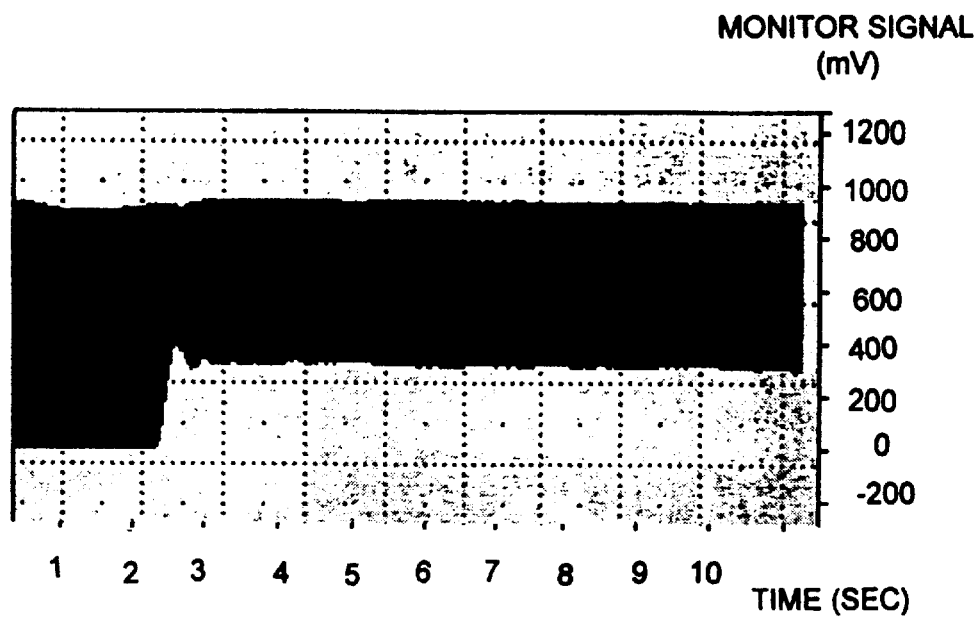
Figure 20:
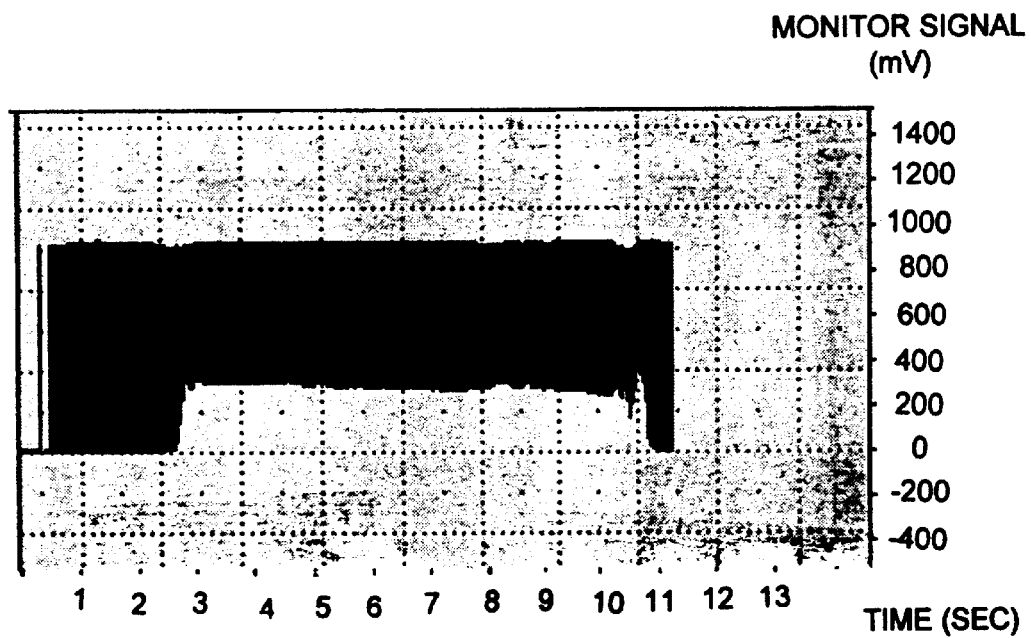
Figure 21:
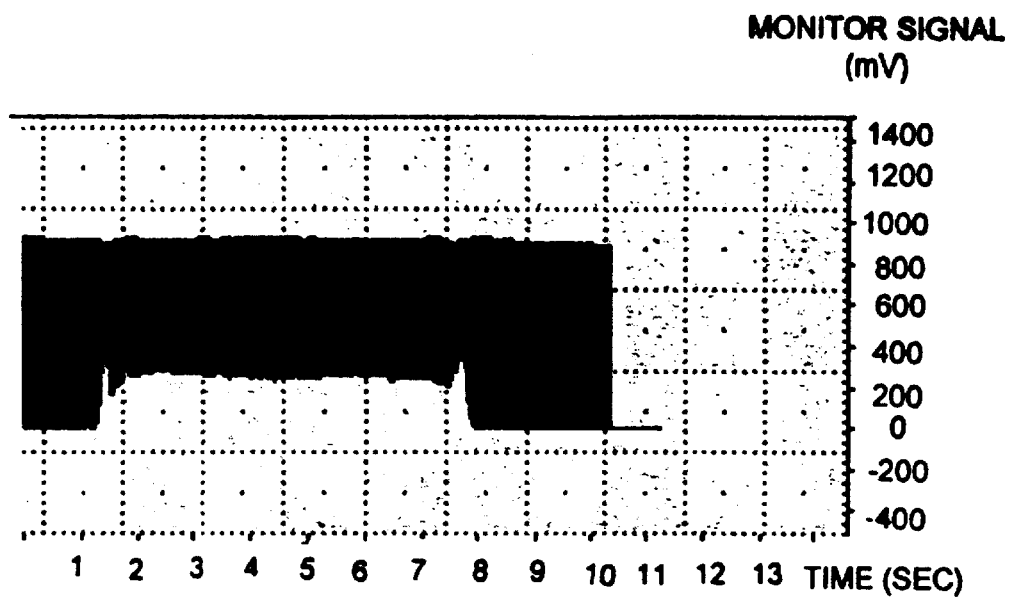
Figure 22:
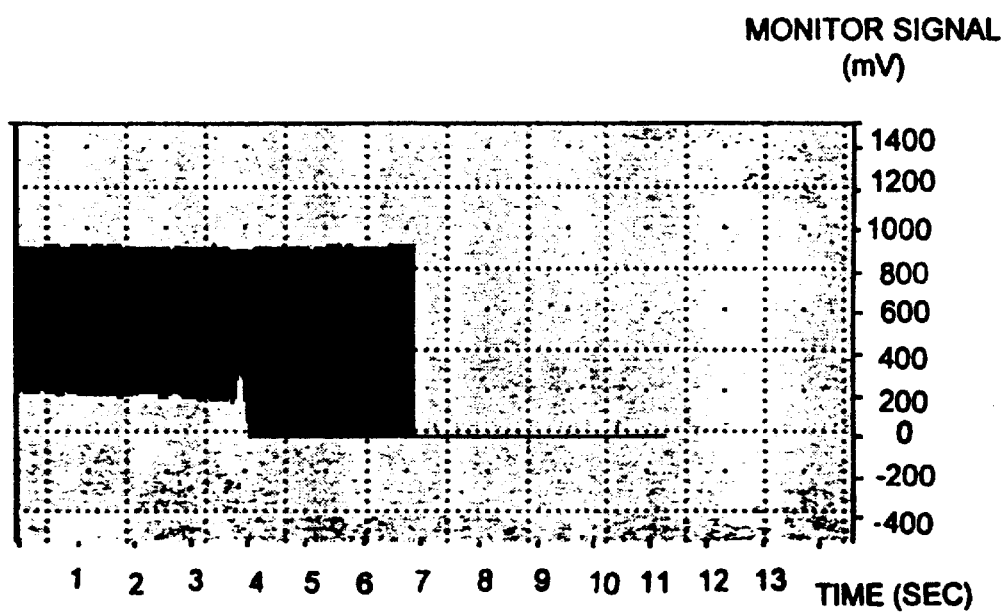
Figure 23:
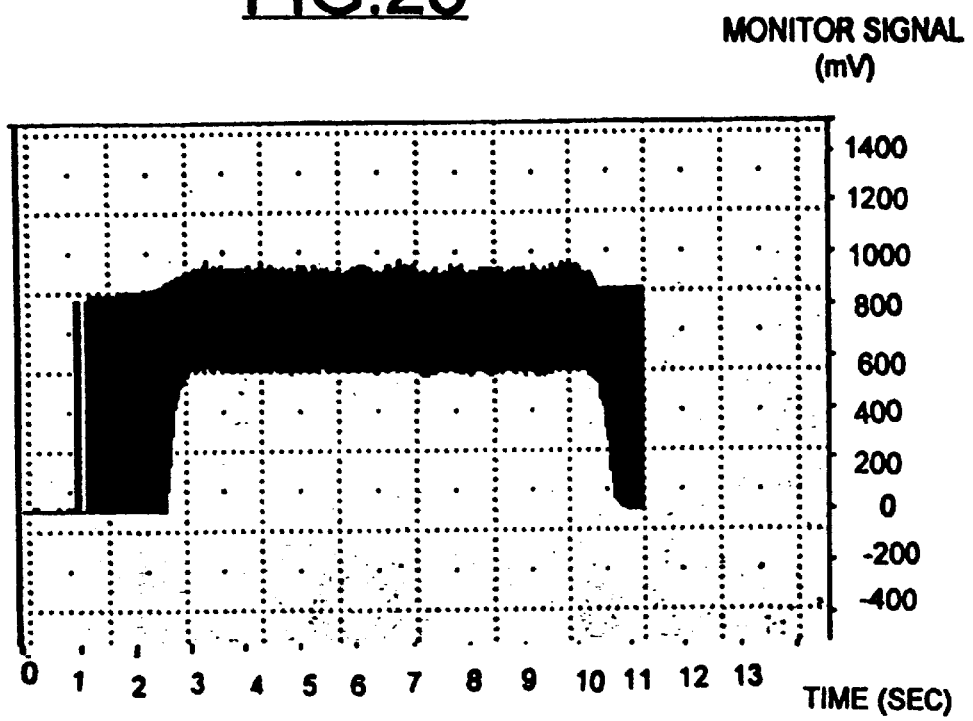
Figure 24:
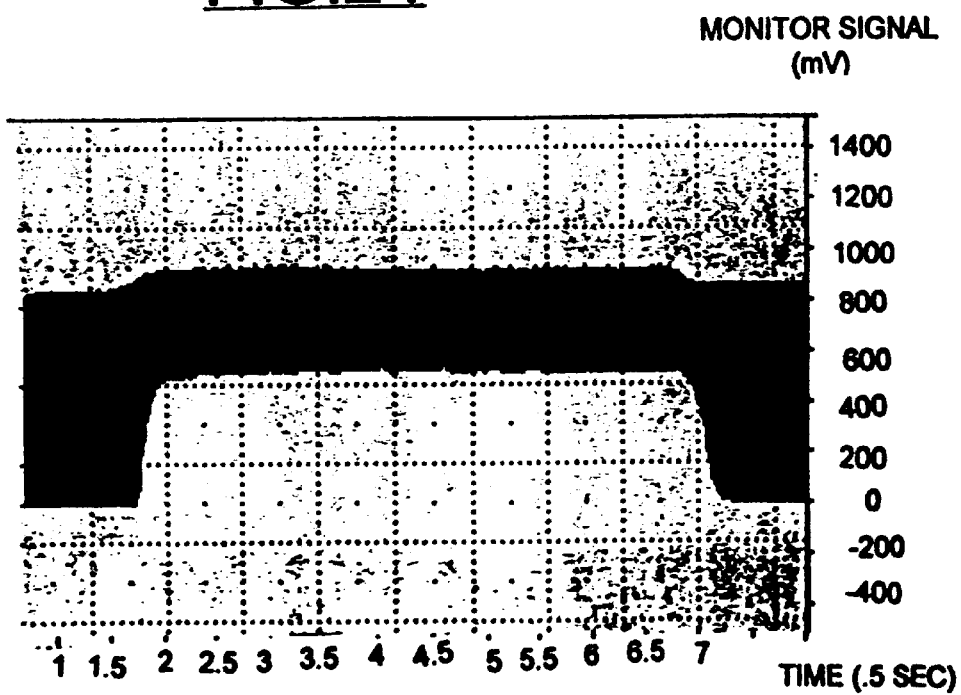
Figure 25:
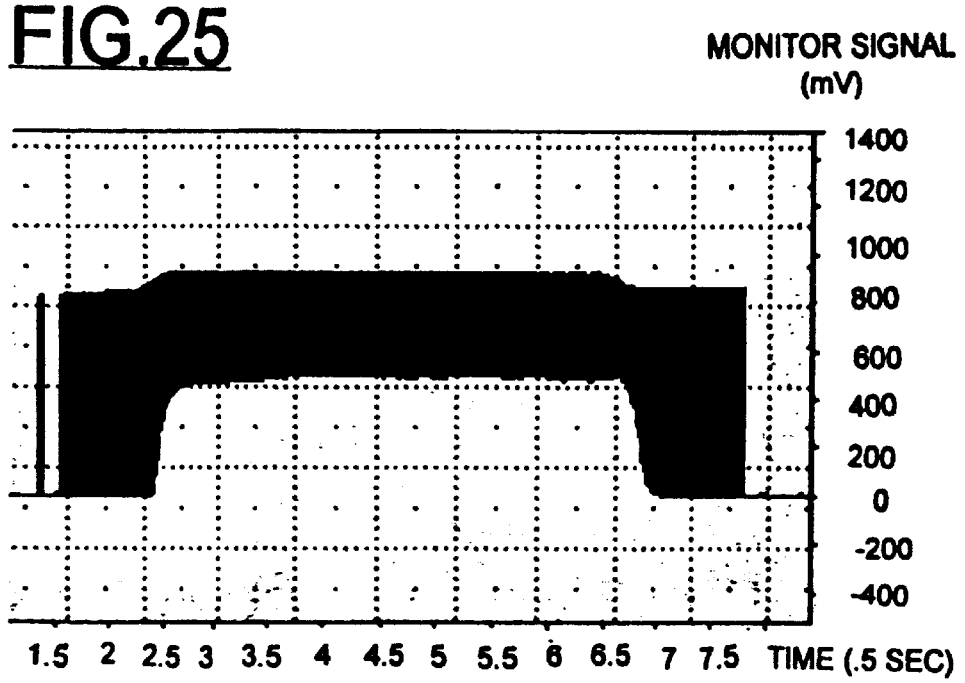
Figure 26:
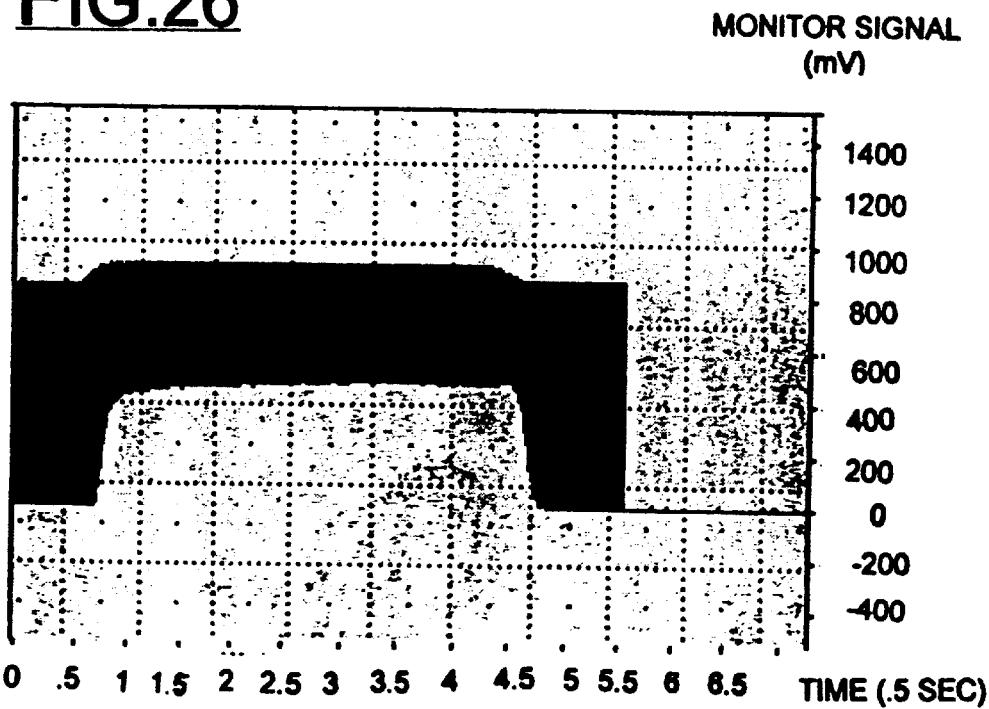
Figure 27:
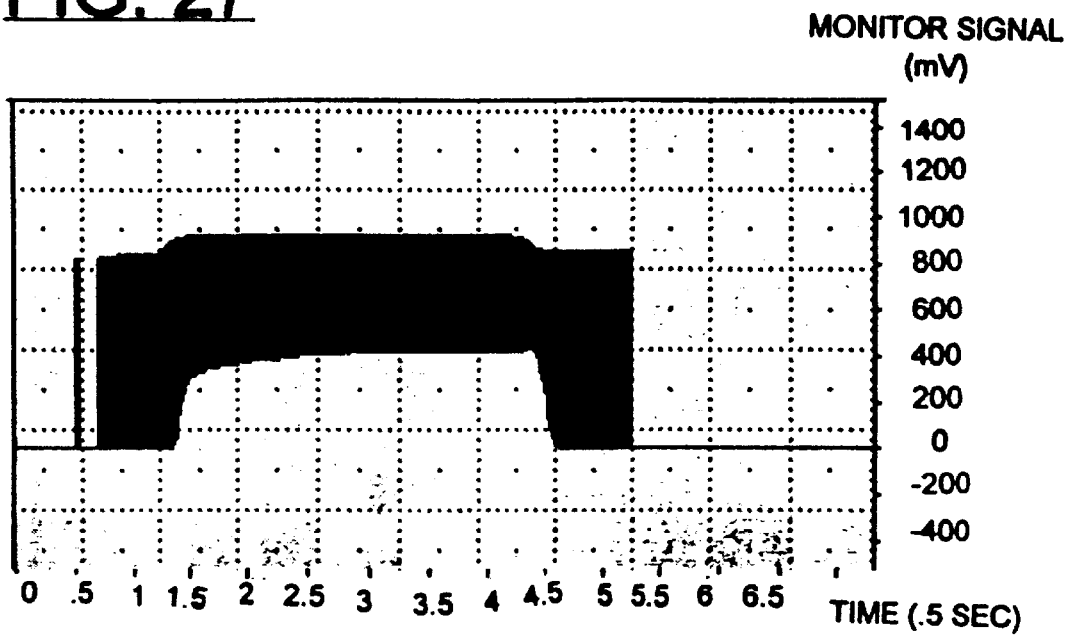
Figure 28:
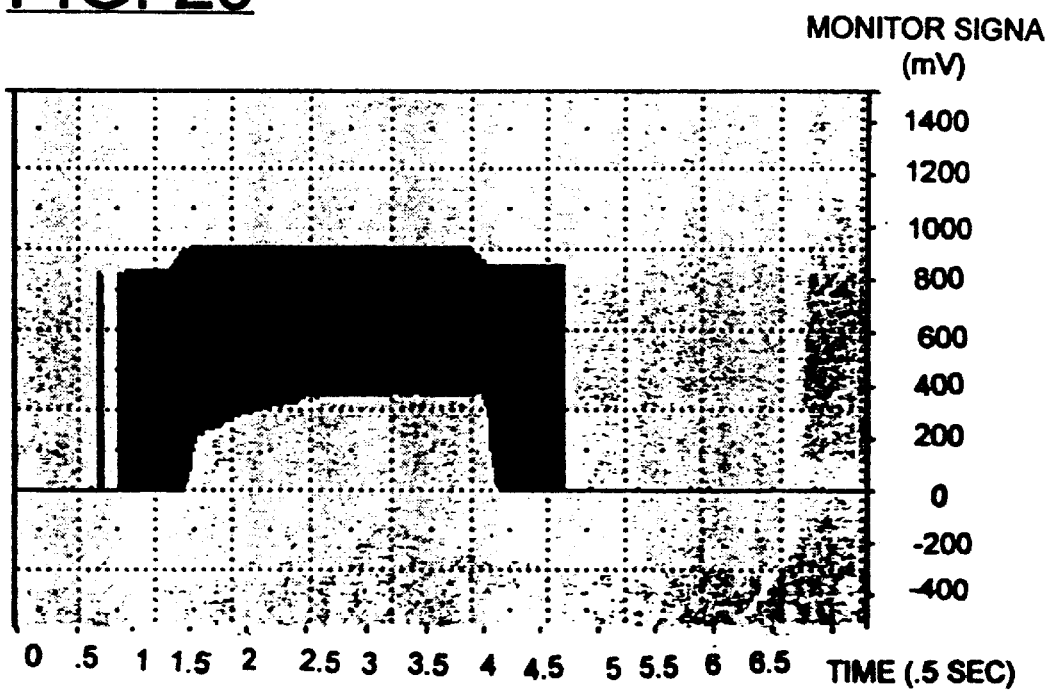
Figure 29:
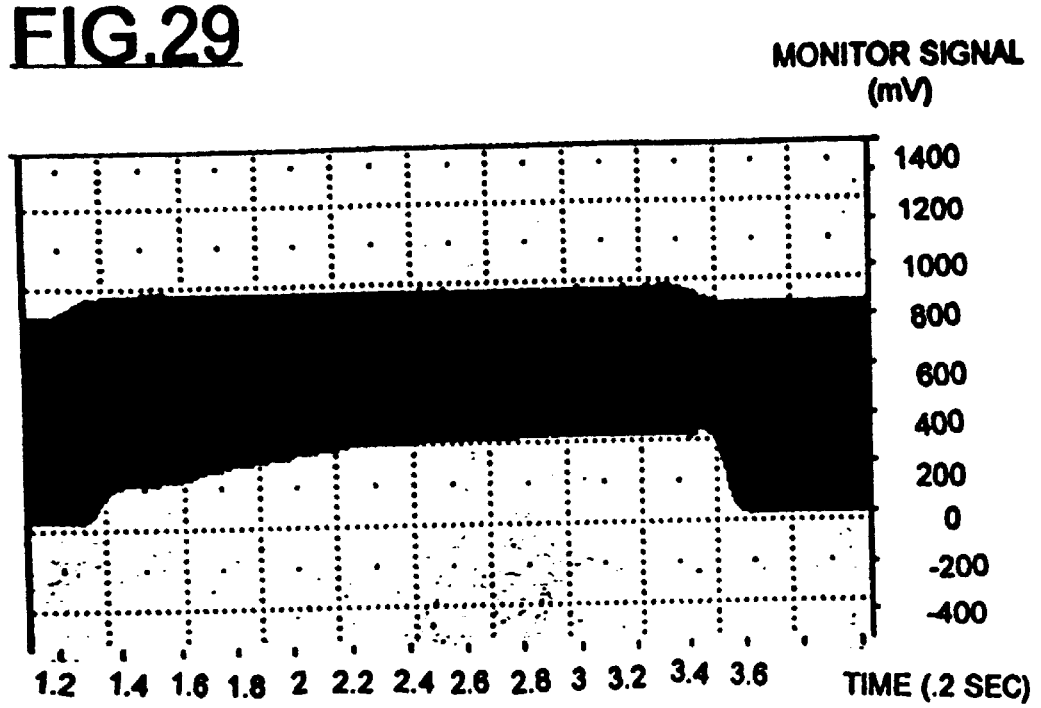
Figure 30:
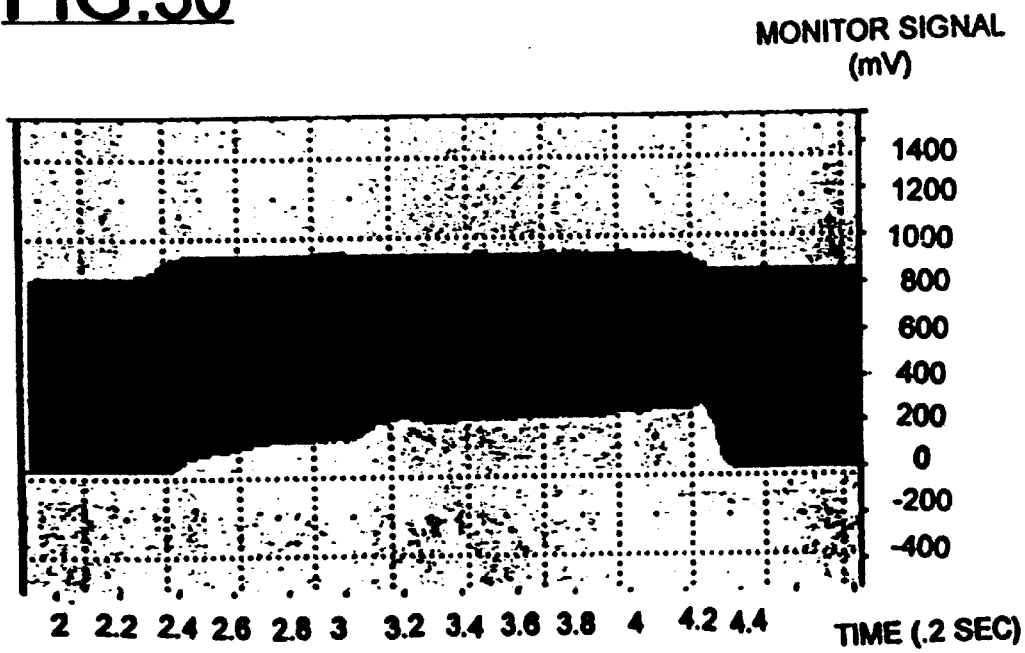
Figure 31:
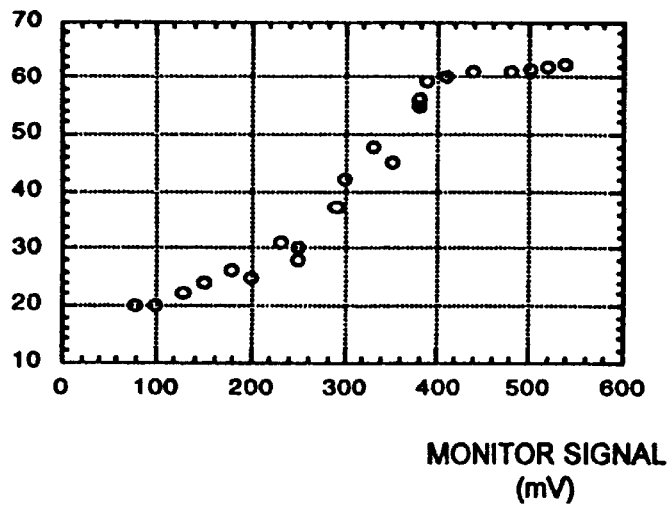
Figure 32:
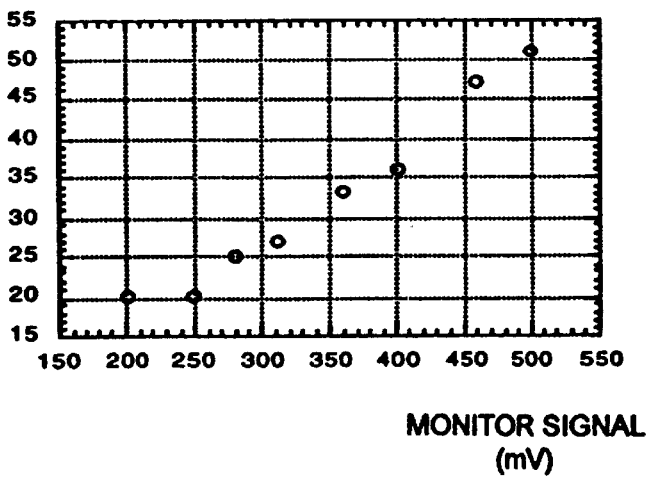
Figure 33:
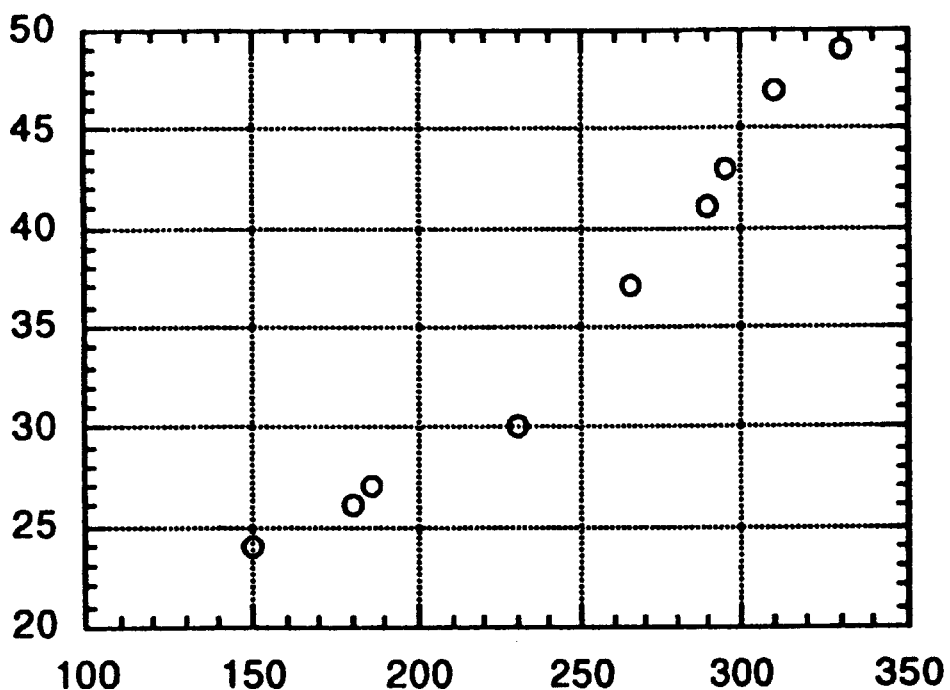
Figure 34:
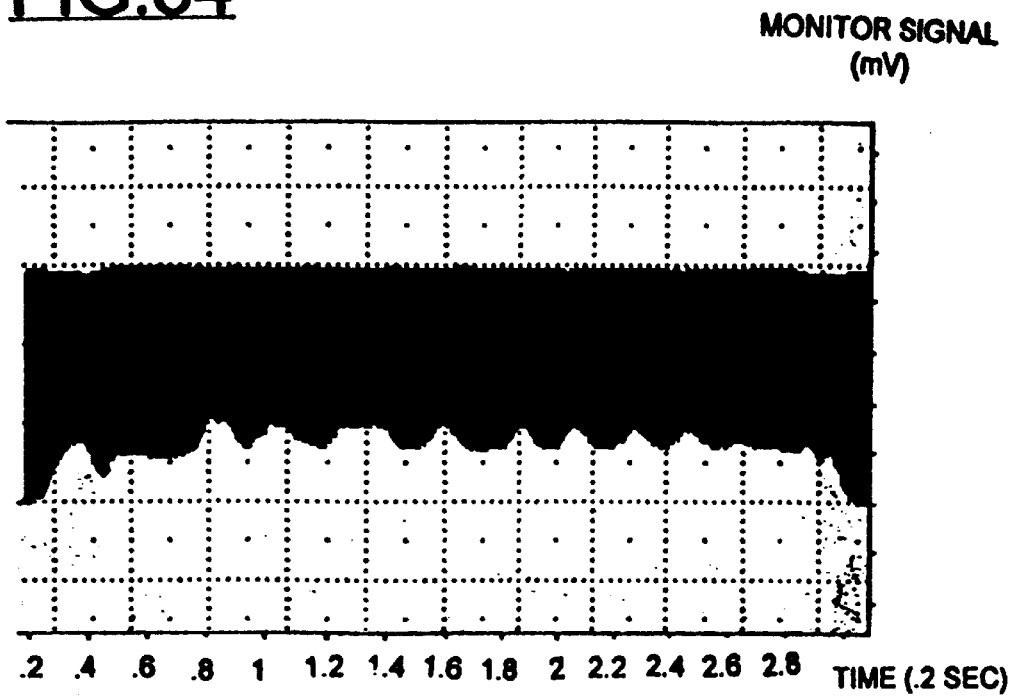
Figure 35:
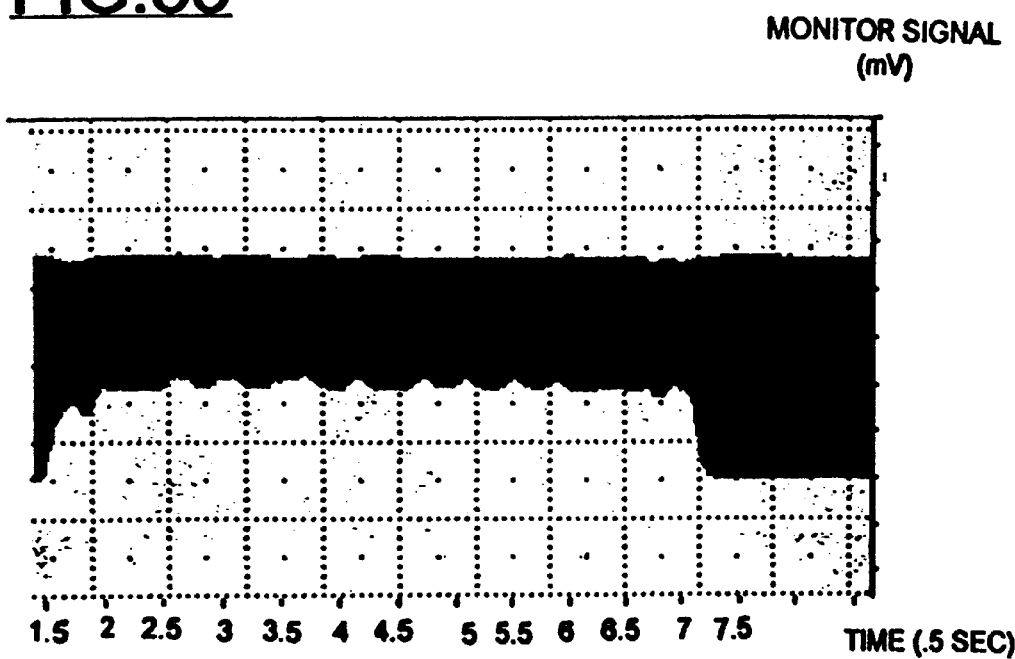

FIG. 15 shows a weld monitor signal of surface hardening of gray case iron at travel speed of 1 cm/sec. FIG. 16 shows a weld monitor signal of surface hardening of gray cast iron at travel speed of 1.5 cm/sec. FIG. 17 shows a weld monitor signal of surface hardening of gray cast iron at travel speed of 2 cm/s. FIG. 18 shows a weld monitor signal of surface hardening of gray cast iron at travel speed of 2.5 cm/s. FIG. 19 shows a weld monitor signal of surface hardening of gray cast iron at travel speed of 3 cm/s. FIG. 20 shows a weld monitor signal of surface hardening of gray cast iron at travel speed of 3.5 cm/s. FIG. 21 shows a weld monitor signal of surface hardening of gray cast iron at travel speed of 4 cm/s. FIG. 22 shows a weld monitor signal of surface hardening of gray cast iron at travel speed of 5 cm/s. FIG. 23 shows a weld monitor signal of surface hardening of 1045 steel at travel speed of 1 cm/s. FIG. 24 shows a weld monitor signal of surface hardening of 1045 steel at travel speed of 1.5 cm/s. FIG. 25 shows a weld monitor signal of surface hardening of 1045 steel at travel speed of 1.8 cm/s. FIG. 26 shows a weld monitor signal of surface hardening of 1045 steel at travel speed of 2 cm/s. FIG. 27 shows a weld monitor signal of surface hardening of 1045 steel at travel speed of 2.5 cm/s. FIG. 28 shows a weld monitor signal of surface hardening of 1045 steel at travel speed of 3 cm/s. FIG. 29 shows a weld monitor signal of surface hardening of 1045 steel at travel speed of 3.5 cm/s. FIG. 30 shows a weld monitor signal of surface hardening of 1045 steel at travel speed of 4 cm/s. FIG. 31 shows a plot of bulk hardness versus weld monitor DC voltage level for 1045 steel. FIG. 32 shows a plot of bulk hardness versus weld monitor DC voltage level for gray cast iron. FIG. 33 shows a plot of bulk hardness versus weld monitor DC voltage level for a single track of 1045 steel produced at feed of 3 cm/s. FIG. 34 shows a weld monitor signal obtained from the vertical track in FIG. 33 at travel speed of 5 cm/s. FIG. 35 shows a weld monitor signal obtained from the vertical track in FIG. 33 at travel speed of 2.5 cm/s.

The following tables 3 and 4 provide tabulated data obtained for a series of tests carried out with the high power pulsed Nd:YAG laser on gray cast iron (3.10–3.50 wt % carbon content) and 1045 steel respectively. The pulse parameters are set to simulate the effect of a cw laser taking into account the thermal relaxation time of the metal. The same pulse settings are used for both alloy and the travel speed of the part is varied. Bulk hardness are then obtained on the heat treated tracks. The corresponding monitor output DC level voltages are also tabulated. A column indicates whether melting of the surface occurred at low travel speeds. The cast iron is more difficult to harden without surface melting because a significantly longer time-at-temperature is required to diffuse carbon atoms from the graphite flakes into the matrix during laser heating. FIGS. 15—30 show the raw data from the monitor where the voltage is plotted versus time. The closely spaced pulses are the dark upper part of the chart and the DC level is the top of the white portion of the chart. The pulses are a consequence of the pulsed beam and would not be present if a cw laser is used. Plots of the bulk hardness versus weld monitor DC voltage level for the two alloy are shown in FIGS. 31 and 32. FIG. 33 shows the bulk hardness versus weld monitor DC voltage level for a single track produced at feed of 3 cm/s.

TABLE 3

Monitor signal and hardness of gray casting iron

| Travel speed (cm/s) | Monitor signal (mv) | Hardness (HRC) | Melting (Y/N) |
|---|---|---|---|
| 1 | 500 | 51 | Y |
| 1.5 | 460 | 47 | Y |
| 2 | 400 | 36 | slightly |
| 2.5 | 360 | 33 | slightly |
| 3 | 310 | 27 | slightly |
| 3.5 | 280 | 25 | N |
| 4 | 250 | <20 | N |
| 5 | 200 | <20 | N |

TABLE 4

Monitor signal and hardness of 1045 steel

| Travel speed (cm/s) | Monitor signal (mv) | Hardness (HRC) | Melting (Y/N) |
|---|---|---|---|
| 1 | 540 | 62.5 | Y |
| 1.5 | 520 | 62 | Y |
| 1.8 | 500 | 61.5 | Y |
| 2 | 480 | 61 | slightly |
| 2.5 | 380 | 55 | slightly |
| | 390 | 59 | |
| | 410 | 60 | |
| | 440 | 61 | |

TABLE 4-continued

Monitor signal and hardness of 1045 steel

| Travel speed (cm/s) | Monitor signal (mv) | Hardness (HRC) | Melting (Y/N) |
|---|---|---|---|
| 3 | 250 | 30 | N |
|  | 290 | 37 |  |
|  | 350 | 45 |  |
|  | 380 | 56 |  |
| 3.5 | 150 | 24 | N |
|  | 180 | 26 |  |
|  | 230 | 31 |  |
|  | 300 | 42 |  |
|  | 330 | 48 |  |
| 4 | 80 | <20 | N |
|  | 100 | <20 |  |
|  | 130 | 22 |  |
|  | 200 | 25 |  |
|  | 250 | 28 |  |

1. Laser schedule E3L2R100 (Alternative) 2. The hardness HRC was the average reading at the corresponding weld monitor voltage.

The raw data for the monitor output shows that a stable voltage is produced for treated tracks that achieved substantial hardness. In fact a linear relationship exists between voltage and hardness up to the maximum hardness possible. The first datum for the cast iron case in FIG. 31 did not produce any increase in hardness. Other data fits a linear relationship. The data for the 1045 steel is similar except that the maximum hardness reached is about 60 HRC. Some additional increase is provided when melting occurs. This simple relationship of the monitor voltage signal with hardness makes it easy to monitor process hardness and quality. A calibration test on prototypic material can be used to determine at what voltage level melting occurs and the heat treating process hardness can be monitored easily by setting an upper and lower bound for the voltage signal.

FIGS. 34 and 35 illustrate the raw data from the weld monitor for two heat treated tracks produced on a gray cast iron component and a 1045 steel plate. The additional melting and small surface change are indicated in the monitor output by the corresponding "bumps" in the data. The melting and surface changes were caused by the heat treated tracks overlapping previously heat treated tracks. The "low" bump at the beginning of the data for the cast iron case is caused by the depression in the component. Hence, the monitor also tracks changes in surface quality or flatness of the part that is being treated.

While the present invention has been described with reference to the details of the embodiments of the invention shown in the drawing, these details are not intended to limit the scope of the invention as claimed in the appended claims.

What is claimed is:

1. A method for weld monitoring comprising the steps of:

detecting an infrared (IR) signature emitted by a hot weld surface during welding;

comparing said detected infrared signature with a steady state infrared signature signal; and correlating said compared results with a predetermined weld parameter of a workpiece misalignment by identifying variations in a direct current (DC) component of said detected infrared signature.

2. A method for weld monitoring comprising the steps of:

detecting an infrared (IR) signature emitted by a hot weld surface during welding;

comparing said detected infrared signature with a steady state infrared signature signal; and correlating said compared results with a predetermined weld parameter of a workpiece contamination by identifying noise variations in said detected infrared signature.

3. A method for weld monitoring comprising the steps of:

detecting an infrared (IR) signature emitted by a hot weld surface during welding;

comparing said detected infrared signature with a steady state infrared signature signal; and correlating said compared results with a predetermined weld parameter of a full penetration weld by identifying an abrupt discontinuity in said detected infrared signature.

4. The method for weld monitoring as recited in claim 3 includes the steps of identifying alternating current (AC) and direct current (DC) components of said detected infrared signature.

5. The method for weld monitoring as recited in claim 4 wherein the step of comparing said detected infrared signature with said steady state infrared signature signal includes the steps of comparing said alternating current (AC) component of said detected infrared signature with an alternating current (AC) component of said steady state infrared signature signal and comparing said direct current (DC) component of said detected infrared signature with a direct current (DC) component of said steady state infrared signature signal.

* * * * *